United States Patent
Kim et al.

(10) Patent No.: US 9,930,619 B2
(45) Date of Patent: Mar. 27, 2018

(54) METHOD FOR SELECTING COMMUNICATION METHOD AND ELECTRONIC DEVICE THEREOF

(71) Applicant: Samsung Electronics Co., Ltd., Gyeonggi-do (KR)

(72) Inventors: Gi-Beom Kim, Gyeonggi-do (KR); Hyuk Kang, Gyeonggi-do (KR); Chun-Ho Park, Seoul (KR); Jun-Hak Lim, Gyeonggi-do (KR); Jun-Sik Kwon, Gyeonggi-do (KR); Hyun-Ju Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 148 days.

(21) Appl. No.: 14/831,034

(22) Filed: Aug. 20, 2015

(65) Prior Publication Data
US 2016/0057803 A1    Feb. 25, 2016

(30) Foreign Application Priority Data

Aug. 21, 2014 (KR) .......................... 10-2014-0108806

(51) Int. Cl.
| | | |
|---|---|---|
| *H04W 52/02* | (2009.01) | |
| *H04W 8/24* | (2009.01) | |
| *H04W 8/00* | (2009.01) | |
| *H04W 88/06* | (2009.01) | |

(52) U.S. Cl.
CPC ......... *H04W 52/0209* (2013.01); *H04W 8/24* (2013.01); *H04W 8/005* (2013.01); *H04W 88/06* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,937,597 B2* | 5/2011 | Mehta | G06F 1/3203 455/115.3 |
| 8,989,804 B2* | 3/2015 | Jutzi | H04W 52/0229 370/254 |
| 9,071,925 B2* | 6/2015 | Viswanathan | H04W 4/005 |
| 2004/0203863 A1 | 10/2004 | Huomo | |

(Continued)

OTHER PUBLICATIONS

A. Catovic & Z. Sahinoglu, Hybrid TOA/RSS and TDOA/RSS Location Estimation Schemes for Short-Range Wireless Networks, Dec. 2004, Mitsubishi Electric Research Laboratories, http://www.merl.com.

(Continued)

*Primary Examiner* — Bunjob Jaroenchonwanit
(74) *Attorney, Agent, or Firm* — Cha & Reiter, LLC

(57) ABSTRACT

A method for operating of an electronic device includes: connecting communication with an external electronic device; identifying state information and service information of the electronic device and the external electronic device; and selecting at least one communication method based on the state information and the service information. An electronic device includes a communication module and a processor. The processor is configured to select at least one communication method from a plurality of communication methods based on state information and service information of the electronic device and the external electronic device.

15 Claims, 20 Drawing Sheets

(56) References Cited

U.S. PATENT DOCUMENTS

| | | |
|---|---|---|
| 2005/0026608 A1 | 2/2005 | Kallio et al. |
| 2005/0148368 A1 | 7/2005 | Scheinert et al. |
| 2006/0099952 A1 | 5/2006 | Prehofer |
| 2007/0121536 A1* | 5/2007 | Aihara .................. H04W 48/18 370/318 |
| 2007/0184871 A1* | 8/2007 | Morita ................ H04W 52/286 455/522 |
| 2007/0265003 A1 | 11/2007 | Kezys et al. |
| 2008/0046542 A1* | 2/2008 | Sano ..................... H04W 36/14 709/218 |
| 2008/0057912 A1 | 3/2008 | Deprun |
| 2008/0200195 A1* | 8/2008 | Abe ....................... H04W 16/14 455/501 |
| 2008/0259874 A1 | 10/2008 | Sivchenko et al. |
| 2009/0023460 A1* | 1/2009 | Cho ......................... H04W 4/02 455/456.2 |
| 2009/0092075 A1* | 4/2009 | Corson ............... H04W 40/244 370/328 |
| 2009/0180440 A1 | 7/2009 | Sengupta et al. |
| 2009/0268654 A1* | 10/2009 | Baglin .................. H04W 48/18 370/311 |
| 2010/0081428 A1 | 4/2010 | Maejima et al. |
| 2010/0157882 A1* | 6/2010 | Moriwaki ......... H04W 36/0005 370/328 |
| 2010/0240355 A1* | 9/2010 | Nerst .................... H04W 48/18 455/422.1 |
| 2010/0285732 A1 | 11/2010 | Sinton et al. |
| 2011/0038311 A1* | 2/2011 | Marin ................... H04W 68/00 370/328 |
| 2011/0145397 A1 | 6/2011 | Burns et al. |
| 2012/0020231 A1 | 1/2012 | Chen et al. |
| 2012/0020298 A1* | 1/2012 | Shon .................... H04W 48/18 370/328 |
| 2012/0084364 A1 | 4/2012 | Sivavakeesar |
| 2012/0140732 A1 | 6/2012 | Sachs et al. |
| 2012/0213205 A1 | 8/2012 | Tammisetti |
| 2012/0290650 A1* | 11/2012 | Montuno .............. H04W 4/008 709/204 |
| 2012/0311661 A1 | 12/2012 | Forssell |
| 2013/0046841 A1* | 2/2013 | Park ........................ H04W 4/08 709/206 |
| 2013/0065526 A1* | 3/2013 | Pottier ................... H04L 67/34 455/41.2 |
| 2013/0143611 A1* | 6/2013 | Nambiar ................. H04W 4/14 455/466 |
| 2013/0157566 A1* | 6/2013 | Oguchi ................. H04W 4/008 455/41.1 |
| 2013/0170500 A1* | 7/2013 | Nishida ............... H04L 67/1074 370/401 |
| 2013/0179901 A1* | 7/2013 | Aho ........................ G06F 9/445 719/313 |
| 2013/0238860 A1* | 9/2013 | Archer ................. G06F 12/126 711/128 |
| 2014/0050085 A1* | 2/2014 | Hong .................... H04L 47/821 370/230 |
| 2014/0094122 A1* | 4/2014 | Etemad ................. H04W 76/02 455/41.2 |
| 2014/0180645 A1* | 6/2014 | Lee ..................... G06F 17/5045 703/1 |
| 2014/0219198 A1* | 8/2014 | Chiu .................... H04W 76/023 370/329 |
| 2014/0241277 A1* | 8/2014 | Suzuki .................. H04W 88/06 370/329 |
| 2014/0286316 A1* | 9/2014 | Park ...................... H04W 36/22 370/332 |
| 2014/0293781 A1* | 10/2014 | Adams .................. H04W 48/18 370/230 |
| 2015/0117467 A1* | 4/2015 | Leung ................... H04W 48/18 370/465 |
| 2015/0126892 A1* | 5/2015 | Kim ..................... A61B 5/0006 600/545 |
| 2015/0180631 A1* | 6/2015 | Zhang ................... H04W 72/02 370/329 |
| 2015/0230207 A1* | 8/2015 | Wang ................. H04B 7/18506 348/143 |
| 2015/0271716 A1* | 9/2015 | Son .................... H04W 36/0055 455/436 |
| 2015/0334717 A1* | 11/2015 | Rashid ............. H04W 72/0493 370/329 |
| 2015/0365828 A1* | 12/2015 | Saida ....................... H04M 3/00 455/411 |
| 2016/0037323 A1* | 2/2016 | Kim ....................... H04W 8/005 370/329 |
| 2016/0050618 A1* | 2/2016 | Kollu .................... H04W 48/18 455/418 |
| 2016/0088449 A1* | 3/2016 | Sharma ................... H04W 4/12 455/426.1 |
| 2016/0112587 A1* | 4/2016 | Hiramatsu ......... H04N 1/00307 348/207.1 |
| 2016/0119966 A1* | 4/2016 | Fujita ................... H04W 4/008 455/41.2 |
| 2016/0234784 A1* | 8/2016 | Hamada ................ G06F 1/3225 |
| 2016/0262155 A1* | 9/2016 | Lindoff ............. H04W 72/0453 |
| 2016/0294965 A1* | 10/2016 | Mei ......................... H04W 4/12 |
| 2016/0323477 A1* | 11/2016 | Sumita ............... H04N 1/00127 |
| 2016/0337943 A1* | 11/2016 | Van Phan .............. H04W 4/06 |

OTHER PUBLICATIONS

Ali Aassie Ali & A.S. Omar, Time of Arrival Estimation for WLAN Indoor Positioning Systems using Matrix Pencil Super Resolution Algorithm, Proceedings of the 2nd Workshop on Positioning, Navigation and Communication (WPNC'05) & 1st Ultra-Wideband Expert Talk (UET'05).

Timothy M. Bielawa, Position Location of Remote Bluetooth Devices, Jun. 2, 2005, Virginia Polytechnic Institute and State University, Blacksburg, VA.

Hak Yong Kim, Comparison of RSSI and TDOF, Aug. 14, 2007.

Tobias Gadeke et al. A bi-modal ad-hoc Localization Scheme for Wireless Networks based on RSS and ToF Fusion, Karlsruhe Institute of Technology, Karlsruhe, Germany, Copyright 2013 IEEE.

* cited by examiner

METHOD FOR SELECTING COMMUNICATION METHOD AND ELECTRONIC DEVICE THEREOF

CLAIM OF PRIORITY

The present application claims priority under 35 U.S.C. § 119 from an application filed in the Korean Intellectual Property Office on Aug. 21, 2014 and assigned Serial No. 10-2014-0108806, the contents of which are incorporated herein by reference in its entirety.

BACKGROUND

1. Field of the Disclosure

Exemplary embodiments of the present disclosure relate to a method and apparatus for selecting a communication method in an electronic device.

2. Description of the Related Art

With the development of information and communication technology and semiconductor technology, various kinds of electronic devices are developing into multimedia devices being capable of providing various multimedia services. For example, the electronic devices provide various multimedia services such as a messenger service, a broadcasting service, a wireless Internet service, a camera service, and a music replay service.

Such electronic devices can be connected with an external electronic device via various wireless communications such as Bluetooth (BT), WiFi-direct, etc. For example, compared with the WiFi communication method, the Bluetooth communication method has a relatively narrow communication range and low data transmission and reception speed, but has the advantage of low power consumption. On the contrary, compared with the Bluetooth communication method, the WiFi communication method has a relatively wide communication range and high data transmission and reception speed, but has the disadvantage of high power consumption. Accordingly, electronic devices, particularly battery-operated electronic devices, may use a communication method that consumes less power (for example, the Bluetooth communication method) to communicate with an external electronic device at a short distance. When the electronic device is a relatively further distance from the external electronic device, the electronic device may maintain a communication connection with the external electronic device by switching to a communication method that consumes more power but has a wider communication range and higher data transmission and reception speed (for example, the WiFi communication method).

The electronic device may switch to a communication method according to a communication condition such as communication signal strength, a communication error rate, a band width (BW), etc. In this case, the electronic device may not consider state information of the electronic device, such as power consumption, a remaining life of a battery, a device state, etc., which changes depending on the communication with the external electronic device, and thus may malfunction in the process of switch the communication method. Due to the electronic device switching the communication method being used based on communication conditions, there is a problem in that the electronic device cannot switch to a communication method as desired by the user according to the state information of the electronic device.

SUMMARY

To address at least some of the above-discussed deficiencies and to obtain certain advantages, a method and apparatus for converting (i.e. switching) to a different communication method based on state information and service information of an electronic device are provided. More particularly, the electronic device performs a first communication with an external electronic device.

The present disclosure also provides a method and apparatus for determining a second communication method based on characteristics of data to be transmitted when an electronic device is disconnected from a first communication method.

The present disclosure also provides a method and apparatus for transmitting data via a second communication method at a high speed after storing a predetermined quantity of data when an electronic device transmits low priority/urgency data via first communication method.

The present disclosure further provides a method and apparatus for determining whether to end communication rather than switch a communication method or re-establish the current communication method when an electronic device deviates from a communication range with an external electronic device while using a service of low importance.

The present disclosure also provides a method and apparatus for determining a time to switch a communication method according to a service currently executed in an electronic device.

The present disclosure also provides a method and apparatus for maintaining operation of a first communication protocol and a second communication protocol simultaneously in an electronic device.

The present disclosure provides a method for operating an electronic device, the method including: connecting communication with an external electronic device; identifying state information and service information of the electronic device and the external electronic device; and selecting at least one communication method based on the state information and the service information.

According to another aspect of the present disclosure, an electronic device includes: a communication module configured to connect communication with an external electronic device; and a processor configured to select at least one communication method based on state information and service information of the electronic device and the external electronic device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
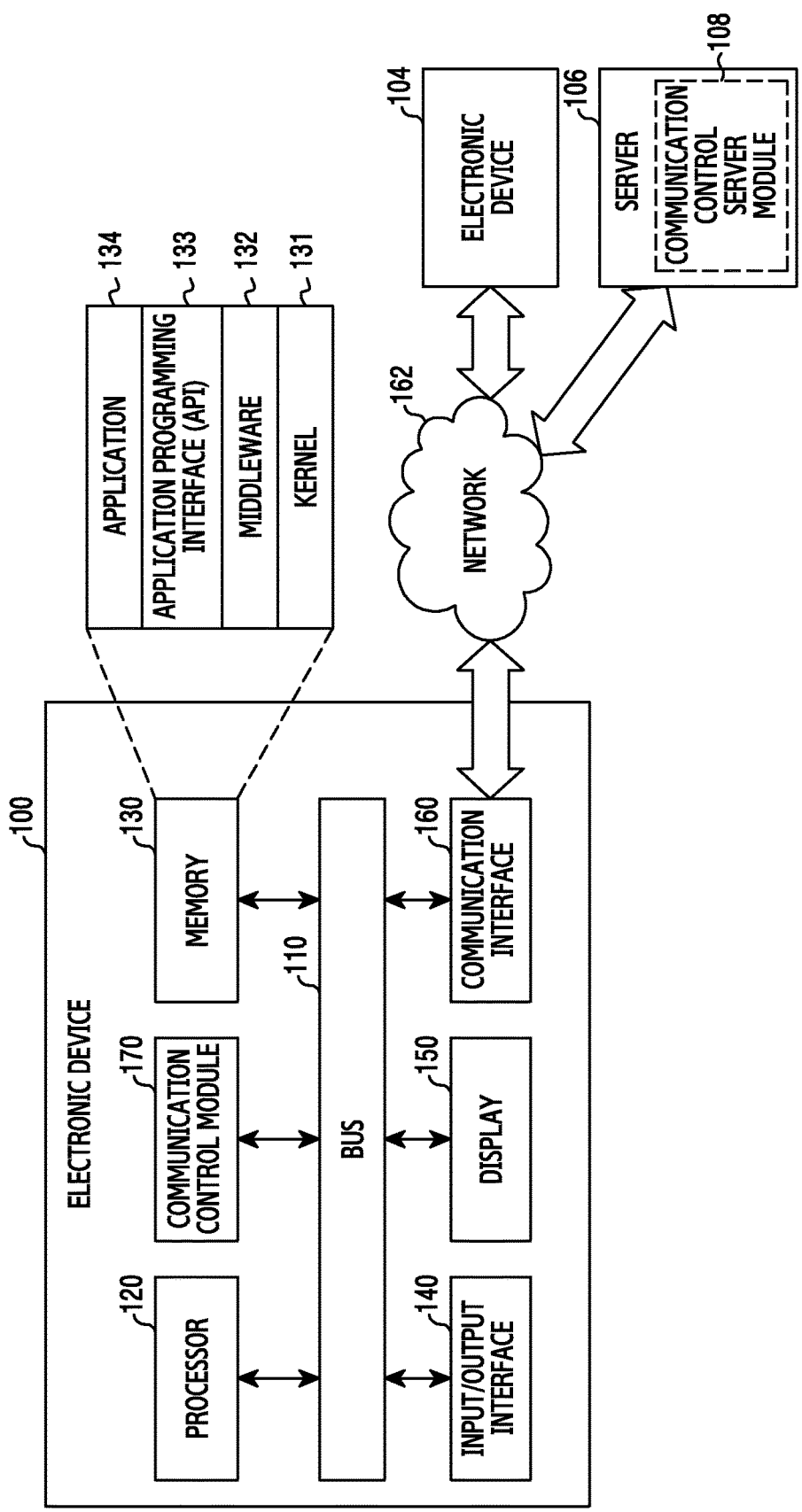
FIG. 1 illustrates a block diagram showing an electronic device according to an exemplary embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, a person of ordinary skill in the art understands that various changes and modifications of the embodiments described herein can be made without departing from the scope and spirit of the present disclosure and the appended claims. In addition, descriptions of well-known functions and constructions may be omitted for clarity and conciseness when their inclusion may obscure the skilled artisan's appreciation of the invention.

The present disclosure has various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "having the capacity to", "designed to", "adapted to", "made to", according to a situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), that performs a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or programming module according to various embodiments of the present disclosure do not constitute software per se nor do the appended claims recite software per se, and the module may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device including a smart mirror function. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance including a smart mirror function. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include, for example, at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an Internet of Things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), each of which includes a smart mirror function.

An electronic device according to various embodiments of the present disclosure may also include a combination of one or more of the above-mentioned devices.

A person of ordinary skill in the art will understand and appreciate that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 illustrates a block diagram showing an electronic device according to an exemplary embodiment of the present disclosure.

Referring now to FIG. 1, the electronic device 100 can include, for example, a bus 110, a processor 120, a memory 130, an input/output interface 140, a display 150, a communication interface 160, and a communication control module 170.

The bus 110 can include a circuit for connecting the aforementioned constituent elements with one another, and forwarding communication (e.g., a control message) between the aforementioned constituent elements.

The processor 120 can include one or more of a Central Processing Unit (CPU), an Application Processor (AP), or a Communication Processor (CP). The processor 120 can, for example, execute an operation or data processing for control and/or communication of at least one other constituent element of the electronic device 100.

The memory 130 may store instructions or data which is received from or generated by the processor 120 or the other elements (for example, the input/output interface 140, the display 150, the communication interface 160, the communication control module 170, and the like).

For example, the memory 130 may include programming modules such as a kernel 131, middleware 132, an Application Programming Interface (API) 133, an application 134, and the like.

The kernel 131 can control or manage system resources (e.g., the bus 110, the processor 120, the memory 130, etc.) used for executing operations or functions implemented in other programs (e.g., the middleware 132, the API 133, or the application program 134). The kernel 131 can provide an interface for the middleware 132, the API 133, or the application program 134 to access the individual constituent element of the electronic device 100, thereby being capable of controlling or managing the system resources.

With continued reference to FIG. 1, the middleware 132 can perform a relay role for the API 133 or the application program 134 to communicate with the kernel 131 and exchange data with the kernel 131. The middleware 132 can perform control over a work request received from the application program 134. For example, the middleware 132 can control (e.g., scheduling or load balancing) the work request by allotting one of application programs 134 capable of using the system resources of the electronic device 100.

The API 133 can include, for example, an interface or a function (e.g., an instruction) for the application program 134 to control a function of the kernel 131 or the middleware 132. For example, the API 133 can include at least one interface, such as file control, window control, image processing, or character control.

For example, the application 134 can include an information exchange application that supports information exchange between the electronic device (e.g., the electronic device 100) and an external electronic device (e.g. the electronic device 104). The information exchange application can, for example, include a notification relay application for relaying specific information to the external electronic device or a device management application for managing the external electronic device.

For example, the notification relay application can include, for example, a function of relaying, to the external electronic device, notification information generated in other applications (e.g., an SMS/MMS application, an e-mail application, a health care application, an environment information application, etc.) of the electronic device. Also, the notification relay application can receive notification information from the external electronic device and provide the received notification information to a user.

For example, the device management application can manage (e.g., install, delete, or update) a function (e.g., turn-on/turn-off of the external electronic device itself (or some constituent components), or adjustment of a brightness (or resolution) of a display) of the external electronic device communicating with the electronic device, an application operating in the external electronic device, or a service (e.g., a telephony service or a message service) provided in the external electronic device.

The application 134 can comprise an application (e.g., the health care application) designated according to an attribute of the external electronic device. For example, the application 134 can include a health care application, when the electronic device is a mobile medical device.

The application 134 can include an application received from the external electronic device (e.g., the server or the electronic device).

The application 134 can include a preloaded application or a third party application downloadable from the server. The names of the constituent elements of the program module according to the illustrated exemplary embodiment can be different according to the kind of an operating system.

According to an exemplary embodiment, the input/output interface 140 may transmit instructions or data inputted by a user through an input and output device (for example, a sensor, a keyboard or a touch screen) to the processor 120, the memory 130, the communication interface 160, or the communication control module 170 through the bus 110. For example, the input/output interface 140 may provide data on a user's touch inputted through a touch screen to the processor 120. In addition, the input/output interface 140 may output instructions or data received from the processor 120, the memory 130, the communication interface 160, or the communication control module 170 through the bus 110 through the input and output device (for example, a speaker or a display). For example, the input/output interface 140 may output voice data processed through the processor 120 to the user through a speaker.

According to an exemplary embodiment, the display 150 may display a variety of information (for example, multimedia data, text data, and the like) for the user.

The communication interface 160 can connect communication between the electronic device 100 and an external device (e.g., the electronic device 104 or the server 106). For example, the communication interface 160 can communicate with the external device while being connected to a network 162 through wireless or wired communication. The wireless communication can include at least one of, for example, Wireless Fidelity (Wi-Fi), Bluetooth (BT), Near Field Communication (NFC), a Global Positioning System (GPS), and cellular communication (e.g., Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)). The wired communication can include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 can be a telecommunication network. The communication network can include at least one of a computer network, the Internet, the Internet of Things, and a telephone network. According to an embodiment, a protocol (e.g., a transport lay protocol, data link layer protocol, or a physical layer protocol) for communication between the electronic device 100 and the external device can be supported by at least one of the applications 134, the application programming interface 133, the middleware 132, the kernel 131, and the communication interface 160.

According to an embodiment, the server 106 can perform at least one of the operations (or functions) implemented in the electronic device 100 to support the driving of the electronic device 100.

According to an exemplary embodiment, when the electronic device 100 is connected with an external electronic device (for example, the electronic device 104 or the server 106), the communication control module 170 may select one or more communication methods based on state information and service information of the electronic device 100 and the external electronic device. For example, the communication control module 170 may determine whether it is necessary to switch to a different communication protocol and whether it is possible to switch to a communication protocol in a first communication state between the electronic device 100 and the external electronic device.

According to an exemplary embodiment, the communication control module 170 may switch from a first communication method to a second communication method based on a Received Signal Strength Indicator (RSSI), communication sensitivity, a communication error rate, a data reception time, or the like, while in the first communication state between the electronic device 100 and the external electronic device.

For example, when the electronic device periodically receives a signal of an RSSI which is smaller than a threshold in the first communication state between the electronic device 100 and the external electronic device, the communication control module 170 may switch from the first communication method to the second communication method. In another example, when the electronic device 100 receives a bit error packet in the first communication state between the electronic device 100 and the external electronic device, the communication control module 170 may switch to the second communication method. However, the aforementioned description should not be considered as limiting the claims in this regard. The communication control module 170 may switch the communication method from the first communication to the second communication based on a variety of communication state information. The first communication state information may include communication environment information of the electronic device 100 and the external electronic device by the first communication method, and state information of the electronic devices performing communication. The bit error packet may indicate a packet (data) including a bit error.

According to an exemplary embodiment, the communication control module 170 may determine whether to switch to the second communication (another communication method) based on the state information and the service information of the external electronic device and the electronic device 100. For example, the service information may include information on the type of service which is being executed or will be executed in the electronic device 100, service priority (degree of urgency), the type of data to be transmitted, and data capacity, and the like. For example, the state information of the external electronic device may include information on whether a user wears the external electronic device (for example, a wearable device), information on whether a battery is charged or not, information on whether the external electronic device is in a sleep mode, or sensor information of the external electronic device. For example, the sensor information of the external electronic device may include a motion state which is detected using an acceleration sensor, a gyro sensor, a geomagnetic sensor, or an electrocardiogram (ECG) sensor, or the like, such as a stopping motion, a walking motion, a running motion, and a moving motion through floors, environment information (for example, daytime, nighttime, an indoor environment, an outdoor environment, flooding, and the like), and health state information of the user of the external electronic device (for example, a heart rate). For example, the state information of the electronic device 100 may include operation mode information of the electronic device, information on whether a battery is charged or not, information on whether the electronic device is in a sleep mode, sensor information of the electronic device, and the like, just to name a few non-limiting possibilities. For example, the operation mode information of the electronic device may include a flight mode, a driving mode, a walking mode, and the like. For example, the sensor information of the electronic device may include a motion state which is detected using an acceleration sensor, a gyro sensor, a geomagnetic sensor, a proximity sensor, an image sensor, or the like, such as a stopping motion, a walking motion, a running motion, a moving motion through floors, or the like, and environment information (for example, daytime, nighttime, an indoor environment, an outdoor environment, flooding, or the like). However, this should not be considered as limiting, and the communication control module 170 may determine whether it is necessary to switch to the second communication or not by applying a weight to the above-described criteria.

According to an exemplary embodiment, the server 106 may support driving of the electronic device 100 by performing at least one of the operations (or functions) implemented in the electronic device 100. For example, the server 106 may include a communication control server module 108 to support the communication control module 170 implemented in the electronic device 100. According to an exemplary embodiment, the communication control server module 108 may include at least one element of the communication control module 170 and perform at least one of the operations implemented in the communication control module 170 (for example, on behalf of the communication control module 170).

According to an exemplary embodiment, the communication control module 170 may process at least part of information acquired from the other elements (for example, the processor 120, the memory 130, the input/output interface 140, the communication interface 160, or the like), and provide the information to the user in various methods. For example, the communication control module 170 may control at least some function of the electronic device 100 using the processor 120 or independently from the processor 120, such that the electronic device 100 interworks with another electronic device (for example, the electronic device 104 or the server 106). According to an exemplary embodiment, at least one element of the communication control module 170 may be included in the server 106 (for example, the communication control server module 108), and may be supported with at least one operation to be implemented in the communication control module 170 by the server 106.

According to an exemplary embodiment, the communication control module 170 may be included in the processor 120. The processor may be referred to as a controller or control unit, and has structure such circuitry configured for operation.

Figure 2:
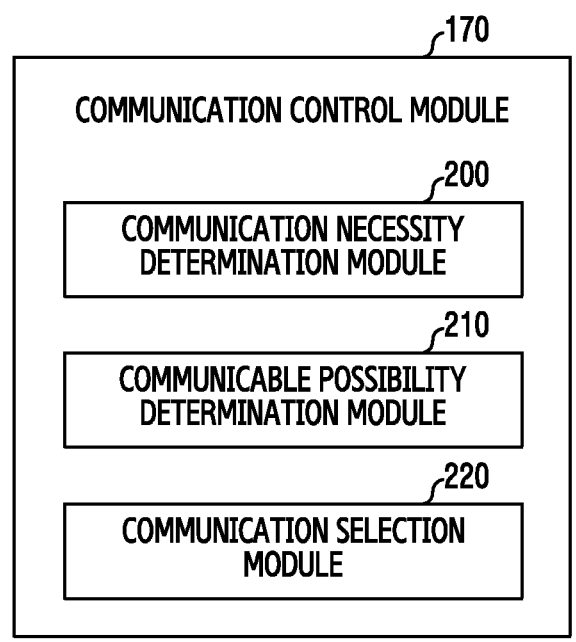
FIG. 2 is a block diagram showing configuration of a communication control module according to an exemplary embodiment of the present disclosure.

FIG. 2 illustrates a block diagram showing a communication control module according to an exemplary embodiment of the present disclosure.

Referring now to FIG. 2, the communication control module 170 may include a communication necessity determination module 200, a communication possibility determination module 210, and a communication selection module 220.

According to an exemplary embodiment, the communication necessity determination module 200 may determine whether it is necessary to switch second communication when the electronic device 100 is connected with an external electronic device via first communication.

According to an exemplary embodiment, the communication necessity determination module 200 may determine whether it is necessary to convert to the second communication based on an RSSI, communication sensitivity, a communication error rate, a data reception time, or the like in the first communication state with the external electronic device. For example, when a link loss is caused in the first communication state with the external electronic device, or when a signal of an RSSI smaller than a threshold is periodically received, the communication necessity determination module 200 may determine that it is necessary to switch to the second communication. In another example, when the electronic device 100 receives a bit error packet in the first communication state with the external electronic device, the communication necessity determination module 200 may determine that it is necessary to switch to the second communication. However, this should not be considered as limiting. The communication necessity determination module 200 may determine whether it is necessary to switch to the second communication or not based on a variety of communication state information.

According to an exemplary embodiment, the communication necessity determination module 200 may determine whether it is necessary (or desired) to switch to the second communication based on state information and service information of the external electronic device and the electronic device 100. For example, the communication necessity determination module 200 may determine whether it is necessary to switch to the second communication by applying a weight to at least one of the state information and the service information of the external electronic device and the electronic device 100.

According to an exemplary embodiment, the communication possibility determination module 210 may determine whether it is possible to switch to the second communication when the electronic device 100 is connected with the external electronic device via the first communication.

According to an exemplary embodiment, the communication possibility determination module 210 may determine whether it is possible to switch to the second communication based on an RSSI, communication sensitivity, a communication error rate, a data reception time, or the like in the first communication state with the external electronic device.

According to an exemplary embodiment, the communication possibility determination module 210 may determine whether the electronic device and the external electronic device support the second communication or not.

According to an exemplary embodiment, the communication selection module 220 may switch communication based on whether it is necessary to switch communication and whether it is possible to switch communication. For example, the communication selection module 220 may selectively switch communication based on the state information and the service information of the electronic device 100 and the external electronic device. For example, the communication selection module 220 may switch from the first communication to the second communication based on the state information and the service information of the electronic device 100 and the external electronic device. For example, the communication selection module 220 may continue maintaining the first communication based on the state information and the service information of the electronic device 100 and the external electronic device. For example, the communication selection module 220 may select both the first communication and the second communication based on the state information and the service information of the electronic device 100 and the external electronic device.

According to an exemplary embodiment, when it is necessary (or optimally desirable) to switch from the first communication to the second communication, the communication selection module 220 may omit to switch to the second communication and maintain the first communication based on the state information and the service information of the electronic device 100 and the external electronic device.

According to an exemplary embodiment, when it is possible to perform the first communication, the communication selection module 220 may switch to the second communication based on the state information and the service information of the electronic device 100 and the external electronic device.

According to various exemplary embodiments of the present disclosure, the processor 120 may be configured to provide at least some function of the communication control module 170.

According to various exemplary embodiments of the present disclosure, an electronic device may include: a communication module to connect communication with an external electronic device; and a processor to select at least one communication method based on state information and service information of the electronic device and the external electronic device.

According to various exemplary embodiments, the state information of the electronic device and the external electronic device may include at least one of communication state information, wearing state information, battery state information, operation state information, and sensor information, and the service information may include at least one of a type of service, service priority, service importance, a type of data, and a data size.

According to various exemplary embodiments, the processor may select at least one of first communication or second communication based on the state information and the service information.

According to various exemplary embodiments, in response to the second communication being selected when the electronic device is connected with the external electronic device via the first communication, the processor may switch the communication connection with the external electronic device from the first communication protocol to the second communication protocol.

According to various exemplary embodiments, in response to a link loss with the external electronic device being detected, the processor may determine whether it is necessary to switch the communication and whether it is possible to switch the communication based on the state information and the service information.

According to various exemplary embodiments, when it is determined that it is necessary to switch the communication and that it is possible to switch the communication, the processor may select at least one communication method according to the state information and the service information.

According to various exemplary embodiments, the processor may disconnect the communication with the external electronic device based on the state information and the service information.

According to various exemplary embodiments, in response to the communication with the external electronic device being disconnected, the processor may discover another external electronic device through the communication module, and, in response to another external electronic device being discovered, may select at least one communication method based on state information and service information of the electronic device and another electronic device.

According to various exemplary embodiments, the processor may determine whether to store data to be transmitted to the external electronic device based on at least one of a size, priority, or urgency of the data to be transmitted, and control to store the data to be transmitted according to a result of the determination.

According to various exemplary embodiments, when the quantity of the stored data exceeds a threshold, the processor may control to switch to the at least one communication method, and transmit the stored data in the at least one communication method.

Figure 3:
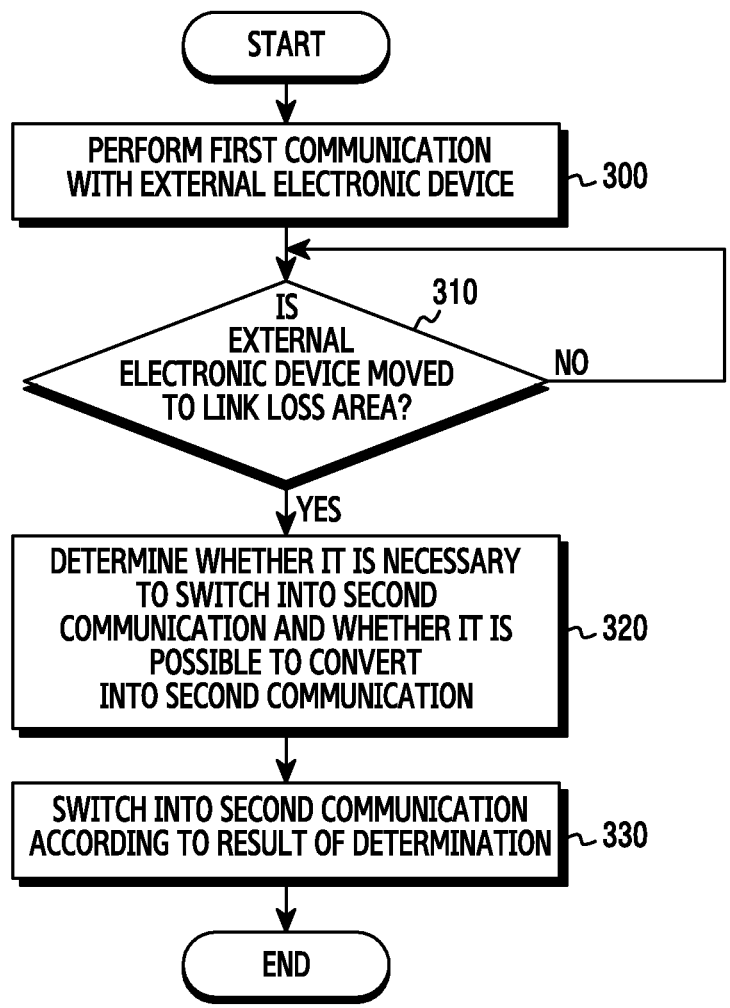
FIG. 3 is a flowchart showing exemplary operation of a method for selecting one or more communication methods according to an exemplary embodiment of the present disclosure.

FIG. 3 illustrates a flowchart showing a method for selecting one or more communication methods according to an exemplary embodiment of the present disclosure.

Referring now to FIG. 3, in operation 300, an electronic device (for example, the electronic device 100) may perform first communication with an external electronic device. For example, the electronic device and the external electronic device may include a smartphone, a tablet PC, or a wearable device (for example, a smart watch). The electronic device and the external electronic device may support both short-distance communication (first communication) and long-distance communication (second communication).

Figure 4:
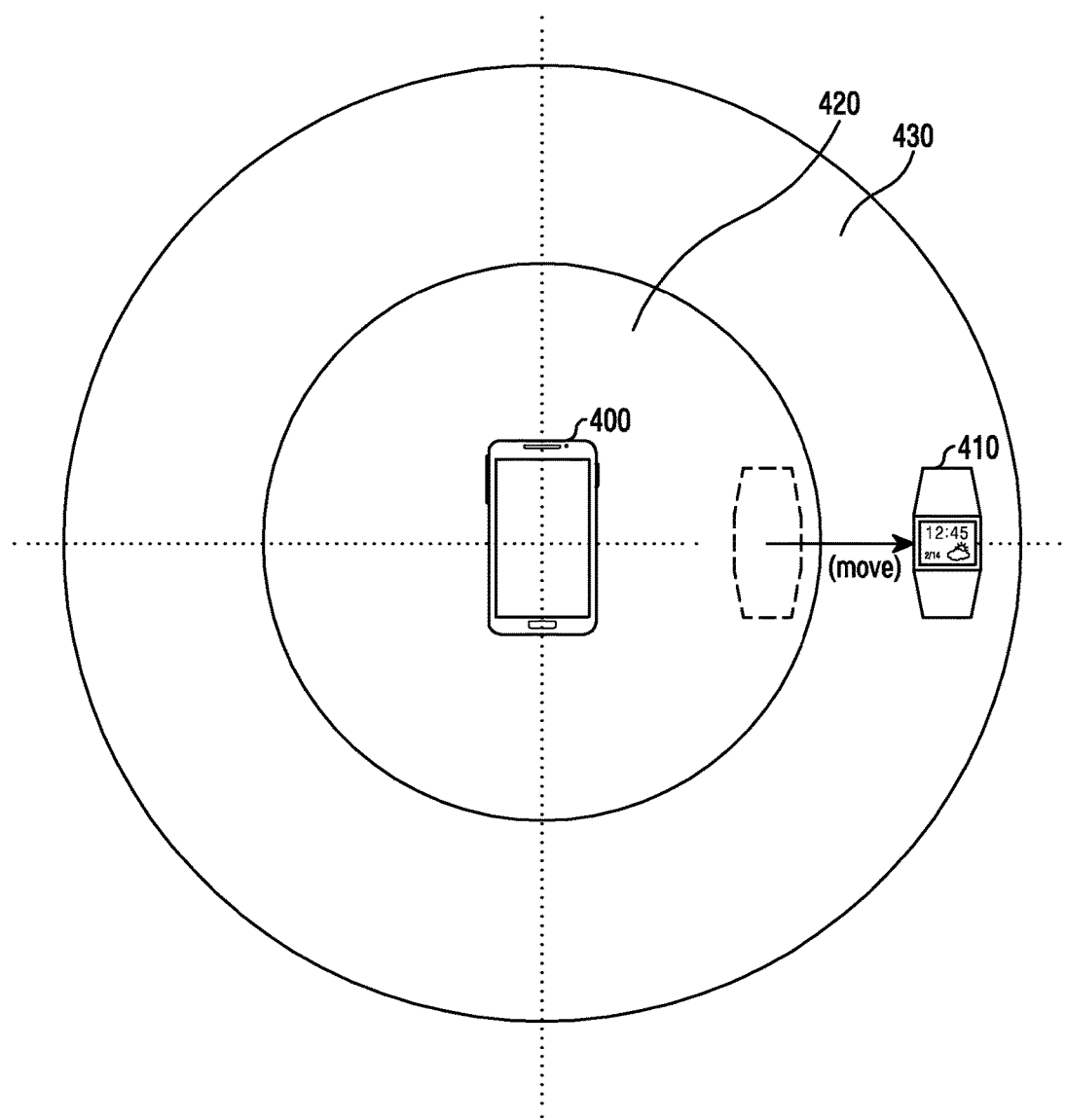
FIG. 4 illustrates a an operational example where a distance between an electronic device and an external electronic device increases according to an exemplary embodiment of the present disclosure.

In operation 310, the electronic device may determine whether the external electronic device is moved to a link loss area or not. According to an exemplary embodiment, the communication control module 170 (for example, the communication necessity determination module 200) may determine whether the external electronic device connected via the first communication is moved out of a communication range, i.e., to an area where a link loss may be caused. For example, referring to FIG. 4, an electronic device 400 may perform first communication with an external electronic device 410 in a first area 420. The external electronic device 410 may be moved to a second area 430 where a link loss may be caused. In this case, the electronic device 400 may suffer the link loss since the quality of the first communication with the external electronic device 410 deteriorates. For example, the electronic device 400 may suffer the link loss since an RSSI is reduced, communication sensitivity is reduced, a communication error rate increases, or a data reception time is delayed in communication with the external electronic device 410.

When the external electronic device is moved to the link loss area, the electronic device may determine whether it is necessary to switch second communication or not and whether it is possible to switch to the second communication or not in operation 320. According to an exemplary embodiment, the communication control module 170 (for example, the communication necessity determination module 200) may determine whether to switch over to the second communication mode based on an RSSI, communication sensitivity, a communication error rate, a data reception time, or the like in the first communication state with the external electronic device. For example, when the electronic device periodically receives a signal of an RSSI which is smaller than a threshold in the communication state with the external electronic device, the communication control module 170 may determine to switch to the second communication. In another example, when the electronic device 100 receives a bit error packet in the communication state with the external electronic device, the communication control module 170 may determine to switch to the second communication. However, this should not be considered as limiting. The communication control module 170 may determine whether to switch to the second communication or not based on a variety of communication state information.

According to an exemplary embodiment, the communication control module 170 may determine whether to switch to the second communication or not based on state information and service information of the external electronic device and the electronic device.

According to an exemplary embodiment, the communication control module 170 (for example, the communication possibility determination module) may determine whether it is possible for the electronic device 100 to switch the communication method with the external electronic device to the second communication or not. For example, the communication control module 170 may determine whether it is possible to switch to the second communication based on an RSSI, communication sensitivity, a communication error rate, a data reception time, or the like in the first communication state with the external electronic device. For example, the communication control module 170 may determine whether the electronic device and the external electronic device support the second communication or not.

In operation 330, the electronic device may switch to the second communication according to the result of the determination. According to an exemplary embodiment, the electronic device may switch from the first communication to one of various second communications. For example, the second communication may include at least one of WiFi Direct, WiFi 2.4G, WiFi 5G, WiFi 60G, Ant+, Zigbee, Ultra Wide Band (UWB), and Z-Wave.

Figure 5:
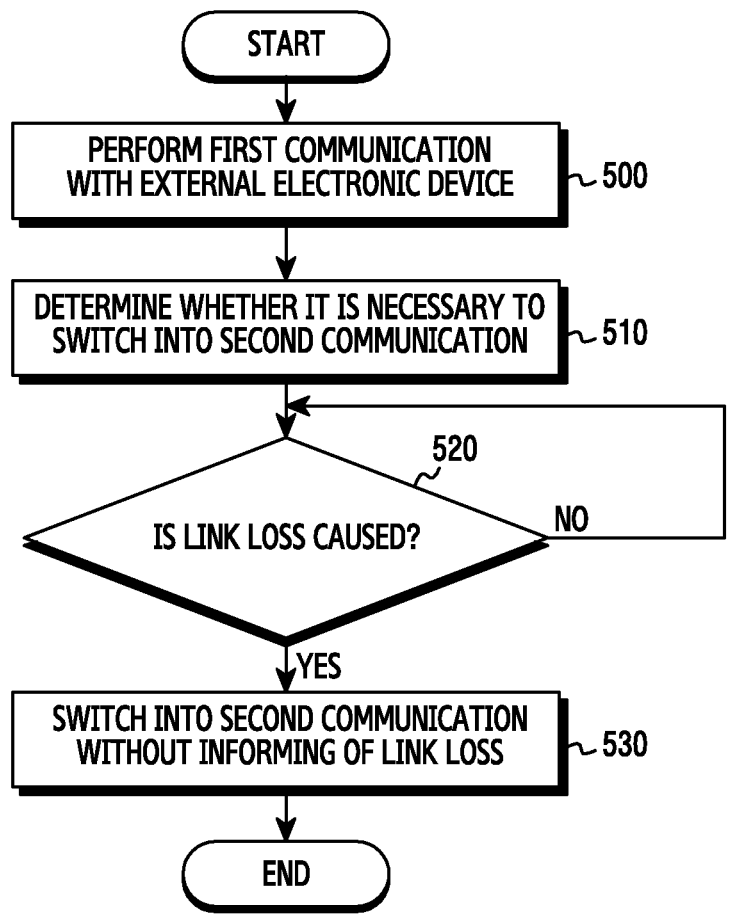
FIG. 5 is a flowchart showing exemplary operation of a method for selecting one or more communication methods regarding whether a link loss has occurred according to an exemplary embodiment of the present disclosure.

FIG. 5 illustrates a flowchart showing a method for selecting one or more communication methods according to an exemplary embodiment of the present disclosure.

Referring to FIG. 5, in operation 500, an electronic device (for example, the electronic device 100) may perform first communication with an external electronic device.

In operation 510, the electronic device may determine whether it is necessary to switch to second communication or not. For example, when the electronic device suffers a link loss in the first communication state with the external electronic device or periodically receives a signal of an RSSI smaller than a threshold, the communication control module 170 may determine that it is necessary to switch to the second communication. In another example, when the electronic device receives a bit error rate in the first communication state with the external electronic device, the communication control module 170 may determine that it is necessary to switch to the second communication. For example, the communication control module 170 may determine whether it is necessary to switch to the second communication or not based on state information and service information of the external electronic device and the electronic device.

When the electronic device determines that it is necessary to switch to the second communication, the electronic device may determine whether a link loss is caused or not in the communication state with the external electronic device in operation 520. According to an exemplary embodiment, the communication control module 170 may detect whether the external electronic device is moved out of a communication range, i.e., to an area where a link loss may be caused, in the first communication state with the external electronic device. For example, referring to FIG. 4, the electronic device 400 may perform first communication with the external electronic device 410 in the first area 420. The external electronic device 410 may be moved to the second area 430 where a link loss may be caused. Accordingly, the electronic device 400 may suffer the link loss since the quality of the first communication with the external electronic device 410 deteriorates.

When it is determined that it is necessary to switch to the second communication and then a link loss is caused, the electronic device may switch to the second communication without informing of the link loss in operation 530. According to an exemplary embodiment, the communication control module 170 may try to switch to the second communication without transmitting link loss information to an upper layer. For example, when it is determined that it is necessary to switch to the second communication (for example, handover) in operation 510, the communication control module 170 may switch to the second communication without transmitting an event on the link loss to the user.

Figure 6:
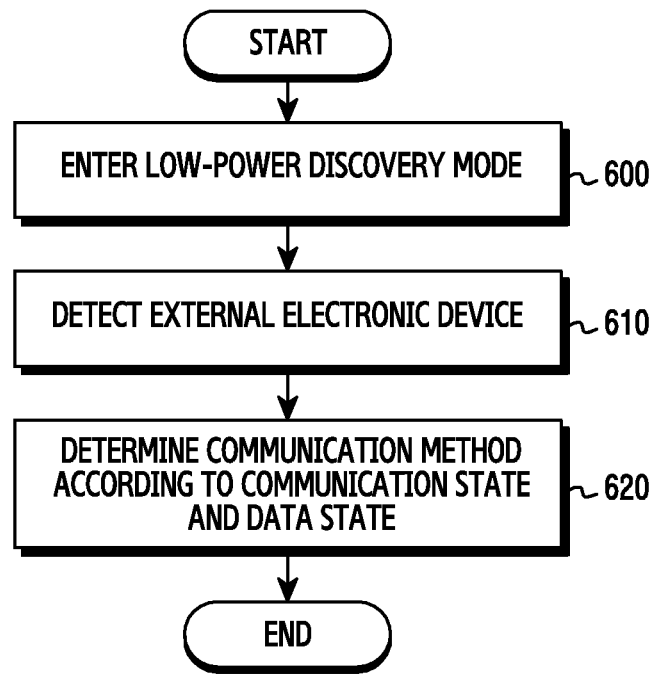
FIG. 6 illustrates a flowchart showing a method for selecting one or more communication methods while in low-power discovery mode according to an exemplary embodiment of the present disclosure.
Figure 7:
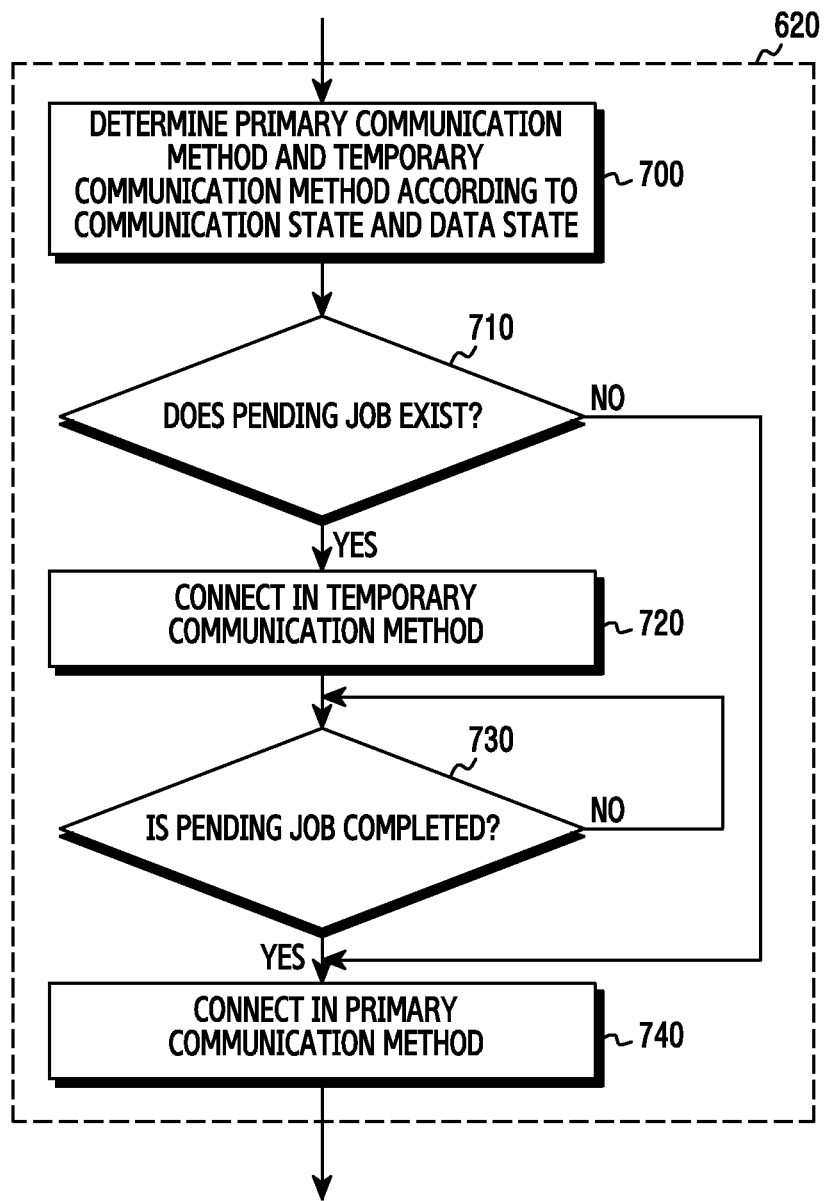
FIG. 7 illustrates a view showing a detailed procedure of operation 620 of FIG. 6 according to an exemplary embodiment of the present disclosure.

FIG. 6 illustrates a flowchart showing a method for selecting one or more communication methods according to an exemplary embodiment of the present disclosure, and FIG. 7 illustrates a flowchart showing a detailed procedure of operation 620 of FIG. 6 according to an exemplary embodiment of the present disclosure.

Referring to FIG. 6, in operation 600, an electronic device (for example, the electronic device 100) may enter a low-power discovery mode to discover an external electronic device to communicate with. According to an exemplary embodiment, the communication control module 170 may perform a low-power discovery using a BLE communication method. For example, in the low-power discovery mode, a transmitting side (advertiser) which transmits a message within a specific range, and a receiving side (scanner) which receives a message may discover a counterpart electronic device by exchanging messages with each other. For example, one of the electronic device and the external electronic device that has relatively many resources is set as the transmitting side, and the other one having less resources is set as the receiving side. The resource may include a wireless resource, a remaining life of a battery, a processing load, and the like.

Figure 8:
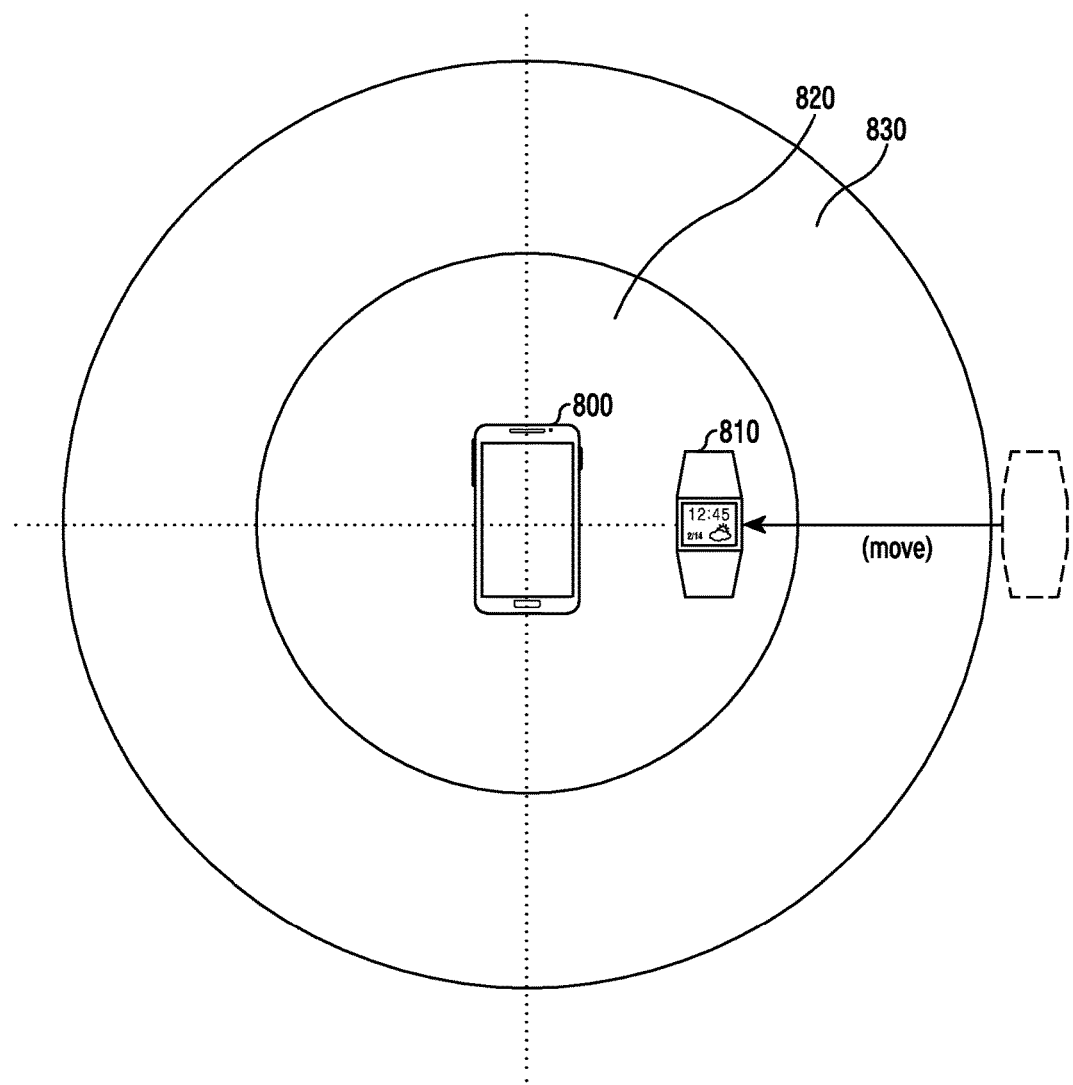
FIG. 8 illustrates a view showing an operational example in which a distance between an electronic device and an external electronic device decreases according to an exemplary embodiment of the present disclosure.

In operation 610, the electronic device may detect the external electronic device. For example, referring to FIG. 8, when an external electronic device 810 which is located out of a second area 830 where it is possible to perform second communication approaches an electronic device 800 and enters a first area 820 where it is possible to perform both the first communication and the second communication, the electronic device 800 may recognize the external electronic device 810.

In operation 620, the electronic device may determine a communication method to be performed with the external electronic device based on communication state information and data state information. For example, the communication control module 170 may determine the communication method based on a quantity of data pending with the external electronic device, current consumption corresponding to each communication, and a time required to transmit pending data.

Operation 620 will be explained in detail with reference to FIG. 7.

Referring to FIG. 7, in operation 700, the electronic device may determine a primary communication method and a temporary communication method according to the communication state information and the data state information. According to an exemplary embodiment, the communication control module 170 may determine the temporary communication method to transmit pending data. For example, the communication control module 170 may determine the temporary communication method based on a quantity of pending data, current consumption corresponding to each communication, current consumption caused by a change in the communication method, a time required to process pending data, and the like. According to an exemplary embodiment, when the pending data is completely processed using the temporary communication method, the communication control module 170 may determine the primary communication method to maintain the communication For example, the communication control module 170 may determine the primary communication method based on a connectible communication method and a communication method required by a service currently executed or to be executed.

In operation 710, the electronic device may determine whether there is a pending job.

When there is a pending job, in operation 720, the electronic device may connect communication with the external electronic device in the temporary communication method, which is determined in operation 700. For example, the communication control module 170 may connect communication with the external electronic device in the temporary communication method and may process the pending data.

In operation 730, the electronic device may determine whether the pending job is completed or not.

When there is no pending job or when the pending job is completed in the temporary communication method, in operation 740, the electronic device may connect communication with the external electronic device in the primary communication method, which is determined in operation 700. According to an exemplary embodiment, when a service provided by the electronic device and the external electronic device supports Bluetooth, the communication control module 170 may determine Bluetooth as the primary communication method. For example, when a time required to process the pending data via Bluetooth exceeds a threshold time, the communication control module 170 may determine WiFi as the temporary communication method. In this case, the communication control module 170 may connect communication with the external electronic device via WiFi and complete the pending job, and then, may connect the service with the external electronic device via Bluetooth, which is the primary communication method. However, this should not be considered as limiting, and the primary communication method and the temporary communication method may be determined according to various criteria.

Figure 9:
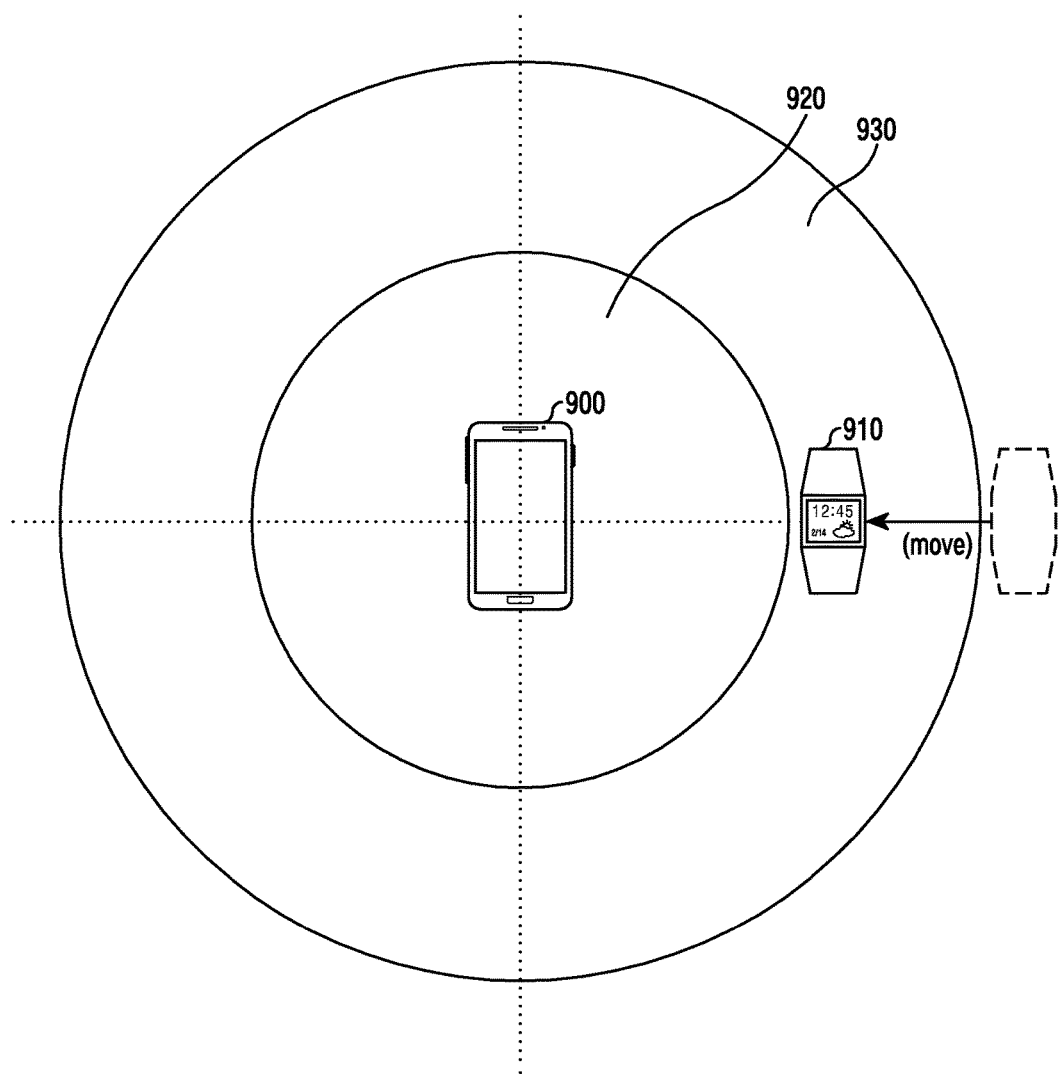
FIG. 9 illustrates a view showing another operational example in which a distance between an electronic device and an external electronic device decreases according to an exemplary embodiment of the present disclosure.

According to various exemplary embodiment, the electronic device may perform a low-power discovery using WiFi to discover the external electronic device to communicate with. In this case, the electronic device may discover the external electronic device using a WiFi signal. For example, referring to FIG. 9, when an external electronic device 910 which is located out of a second area 930 where it is possible to perform second communication approaches an electronic device 900 and enters the second area 930, the electronic device 900 may recognize the external electronic device 910. According to an exemplary embodiment, since the external electronic device 910 is not located in a first area 920 where it is possible to perform first communication, the electronic device 900 may connect communication with the external electronic device 910 in the second communication method. In this case, the electronic device 900 may set the primary communication method and the temporary communication method as the second communication and completes the pending job via the second communication, and then maintain the connection of the service via the second communication.

Figure 10:
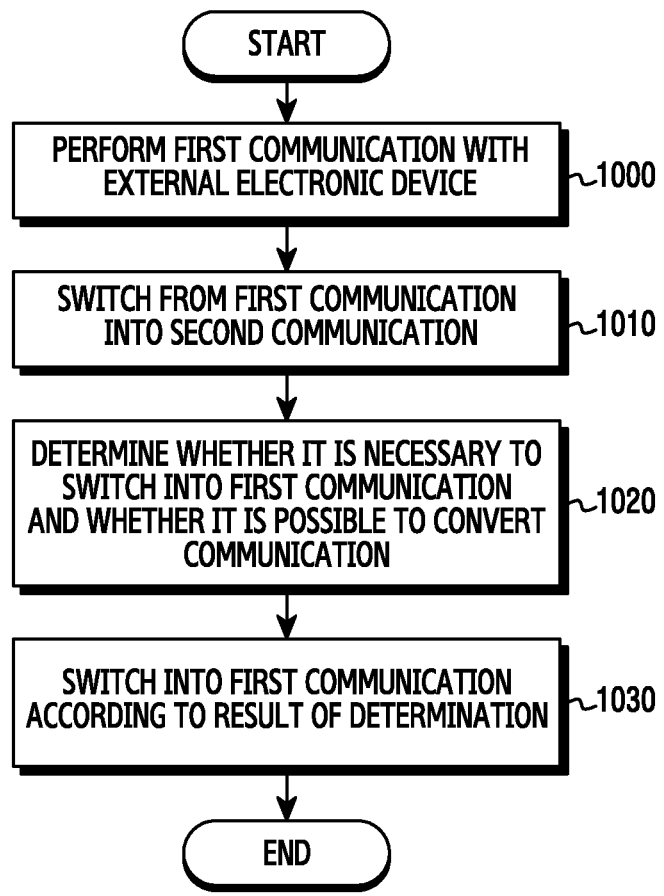
FIG. 10 is a flowchart showing exemplary operation of a method for selecting one or more communication methods according to an exemplary embodiment of the present disclosure.

FIG. 10 illustrates a flowchart showing a method for selecting one or more communication methods according to an exemplary embodiment of the present disclosure.

Referring to FIG. 10, in operation 1000, an electronic device (for example, the electronic device 100) may perform first communication with an external electronic device.

In operation 1010, the electronic device may switch from the first communication to second communication. For example, when the external electronic device is moved out of a first communication range, i.e., to an area where a link loss may be caused, while performing the first communication with the external electronic device, the communication control module 170 may switch the communication with the external electronic device to the second communication. In this case, the communication control module 170 may store information indicating that the first communication connection is necessary since the first communication connection has existed.

Figure 11:
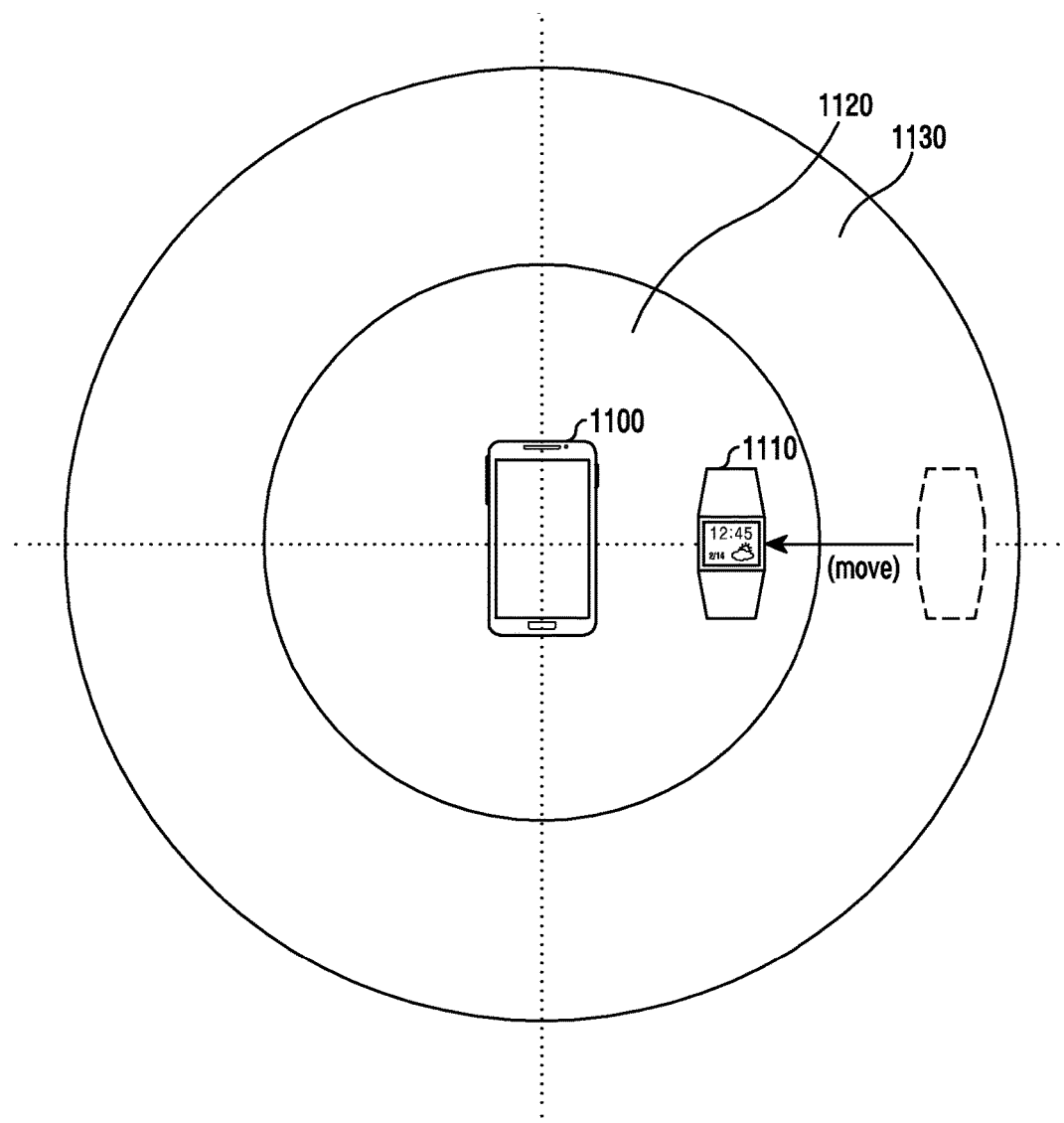
FIG. 11 illustrates a view showing a situation in which a distance between an electronic device and an external electronic device decreases according to an exemplary embodiment of the present disclosure.

In operation 1020, the electronic device may determine whether it is necessary to switch the first communication or not and whether it is possible to switch the communication. According to an exemplary embodiment, referring to FIG. 11, when an external electronic device 1110 connected with an electronic device 1100 via second communication is moved from a second communication range 1130 to a first communication range 1120, the electronic device 1100 may determine whether it is necessary to switch to the first communication and whether it is possible to switch the communication, based on state information of the second communication (for example, an RSSI, communication sensitivity, a communication error rate, a data reception time, or the like).

According to an exemplary embodiment, when it is possible to maintain a corresponding service via the first communication based on switching information from the first communication to the second communication or a state of the service executed via the second communication, the communication control module 170 may determine whether it is necessary to switch from the second communication to the first communication based on a gain of current consumption and a degree of deterioration of service quality. According to an exemplary embodiment, based on whether the RSSI value of the second communication is higher than or equal to a threshold value, whether a bit error rate (BER) estimated based on a channel coding result of received data is reduced, or whether an error detected by error detection such as Cyclic Redundancy Check (CRC) is reduced, the communication control module 170 may determine whether it is possible to switch from the second communication to the first communication. According to an exemplary embodiment, the communication control module 170 may determine whether it is possible to switch to the first communication based on a channel characteristic and a distance between the electronic device and the external electronic device. For example, when the electronic device gets closer to the external electronic device, the channel characteristic for the first communication may be strengthened. For example, in the case of WiFi, the communication control module 170 may grasp the characteristic of the channel based on a pilot packet in a packet. In addition, the communication control module 170 may measure a distance periodically and estimate a distance between the electronic device and the external electronic device.

In operation 1030, the electronic device may switch to the first communication according to the result of the determination in operation 1020. According to an exemplary embodiment, the communication control module 170 may switch from the second communication to one of various first communications.

Figure 12:
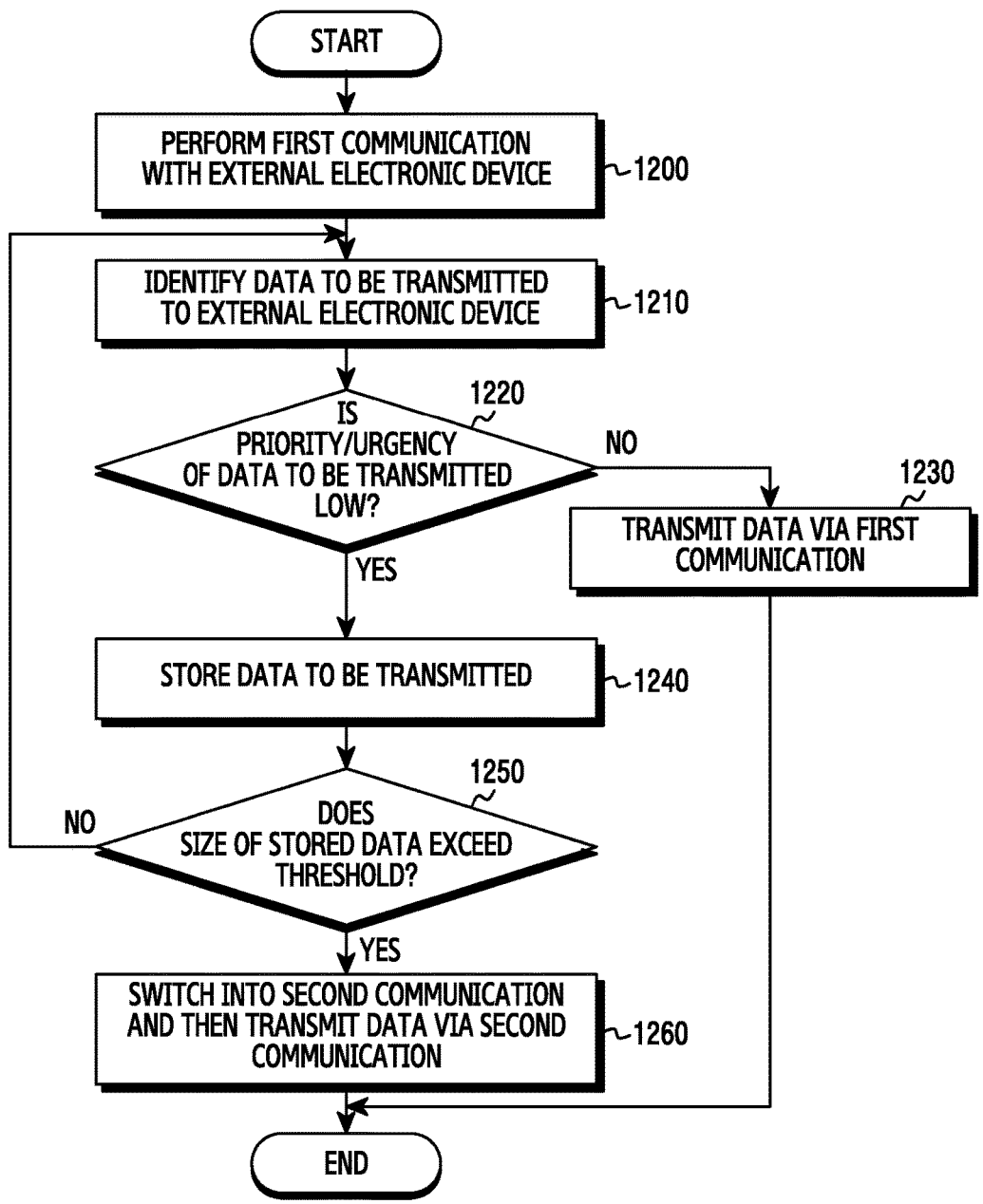
FIG. 12 is a flowchart showing exemplary operation of a method for selecting one or more communication methods according to an exemplary embodiment of the present disclosure.

FIG. 12 illustrates a flowchart showing a method for selecting one or more communication methods according to an exemplary embodiment of the present disclosure.

Referring to FIG. 12, in operation 1200, an electronic device (for example, the electronic device 100) may perform first communication with an external electronic device.

In operation 1210 the electronic device may identify data to be transmitted to the external electronic device. For example, the communication control module 170 may store, in the memory 130, a moving image which is photographed by a camera while performing the first communication with the external electronic device, or transmit the moving image to the external electronic device.

In operation 1220, the electronic device may determine whether the priority/urgency of the data to be transmitted is lower than reference priority/urgency. According to an exemplary embodiment, the priority/urgency of the data may be determined based on the type of the data or the operation state of the electronic device or the external electronic device. For example, the priority/urgency of the data may be determined according to user's setting, or may be determined according to the screen state or the operation state of the electronic device or the external electronic device, or time importance of a currently executed application.

In operation 1230, when the priority/urgency of the data to be transmitted is higher than the reference priority/urgency, the electronic device may transmit the data via the first communication.

In operation 1240, when the priority/urgency of the data to be transmitted is lower than the reference priority/urgency, the electronic device may store the data to be transmitted. According to an exemplary embodiment, the communication control module 170 may temporarily store a moving image which is photographed by the camera in the memory 130 (for example, a buffer). For example, the communication control module 170 may not transmit the moving image and a photo photographed by the camera to the external electronic device, and may accumulate (store) a predetermined quantity of moving images and photos.

In operation 1250, the electronic device may determine whether the size of the temporarily stored data exceeds a threshold or not.

When the size of the temporarily stored data does not exceed the threshold, the electronic device resumes operation 1210 to identify data to be transmitted again.

When the size of the temporarily stored data exceeds the threshold, the electronic device may transmit the temporarily stored data to the external electronic device via second communication in operation 1260. According to an exemplary embodiment, the communication control module 170 may switch the communication with the external electronic device to the second communication. The communication control module 170 may transmit the temporarily stored data to the external electronic device via the second communication which enables high speed communication.

In the present exemplary embodiment, the electronic device identifies data to be transmitted to the external electronic device and switches the method of communication there between. However, this discussion should not be considered as limiting. For example, when the external electronic device transmits a photographed moving image to the electronic device, the external electronic device may determine the priority/urgency of the photographed moving image and transmit the photographed moving image to the electronic device or store the same according to the result of the determination.

Figure 13:
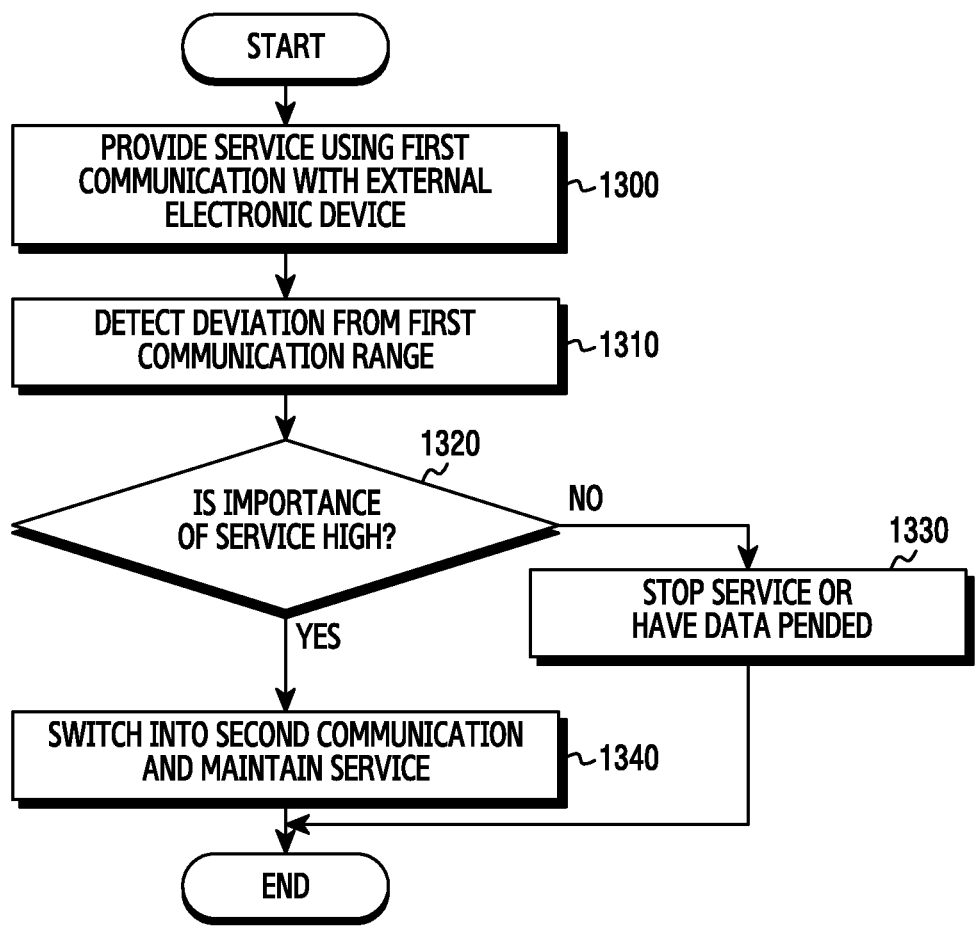
FIG. 13 is a flowchart showing exemplary operation of a method for selecting one or more communication methods according to an exemplary embodiment of the present disclosure.

FIG. 13 illustrates a flowchart showing a method for selecting one or more communication methods according to an exemplary embodiment of the present disclosure.

Referring to FIG. 13, in operation 1300, an electronic device (for example, the electronic device 100) may provide a service using first communication with an external electronic device. For example, the communication control module 170 may provide a voice call service via the first communication with the external electronic device. For example, the communication control module 170 may synchronize a moving image and a photo which are photographed using a camera via the first communication with the external electronic device.

In operation 1310, the electronic device may detect deviation from a first communication range. For example, the communication control module 170 may detect that the external electronic device performing the first communication is moved to a link loss area. For example, referring to FIG. 4, the electronic device 400 may perform first communication with the external electronic device 410 in the first area 420. When the external electronic device 410 is moved to the second area 430 where a link loss may be caused, the electronic device 400 may suffer the link loss since the quality of communication with the external electronic device 410 deteriorates.

In operation 1320, the electronic device may determine whether the importance of the currently provided service is high or not. According to an exemplary embodiment, the communication control module 170 may determine whether the importance of the service with the external electronic device is lower or higher than reference importance. For example, the importance of the service may be determined based on the type of service, the state of the service, the size of the service, the time importance of the service, and the like. For example, when the service with the external electronic device is a voice call service, the communication control module 170 may determine that the importance of the service with the external electronic device is high. For example, when the service with the external electronic device is a moving image synchronization service, the communication control module 170 may determine that the importance of the service with the external electronic device is low. However, this should not be considered as limiting, and the importance of the service may be determined based on various criteria. The user may set the importance of various services.

When it is determined that the importance of the service is relatively low, the electronic device may stop the service or have data pended in operation 1330. According to an exemplary embodiment, in the case of a service having relatively low importance, such as a moving image synchronization service, the communication control module 170 may not switch to another communication, and finish connection and stop the corresponding service. In this case, the communication control module 170 may have data to be transmitted and received through the corresponding service pended (stored).

In operation 1340, when it is determined that the importance of the service is relatively high, the electronic device may switch to the second communication and maintain the service. According to an exemplary embodiment, in the case of a service having relatively high importance such as a voice call, the communication control module 170 may switch to the second communication and maintain the corresponding service (for example, a voice call service).

Figure 14:
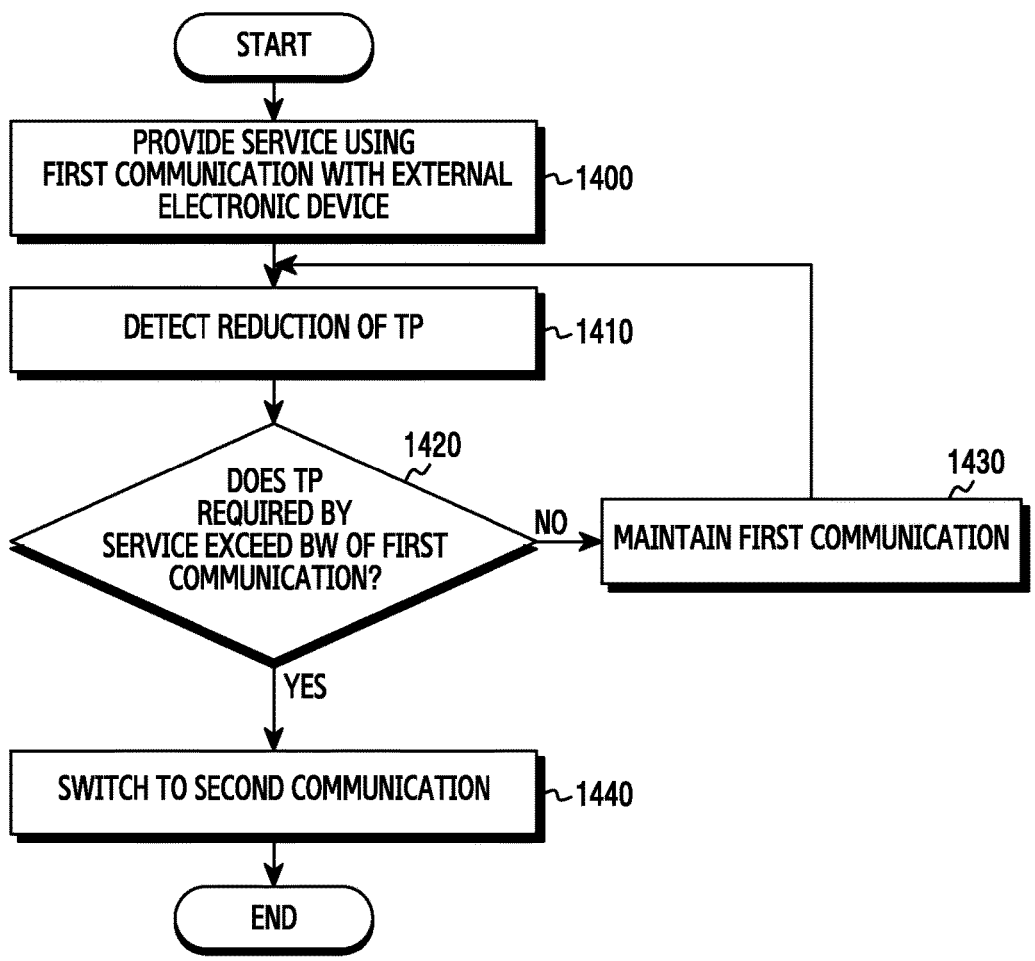
FIG. 14 is a flowchart showing exemplary operation of a method for selecting one or more communication methods according to an exemplary embodiment of the present disclosure.

FIG. 14 illustrates a flowchart showing a method for selecting one or more communication methods according to an exemplary embodiment of the present disclosure.

Referring to FIG. 14, in operation 1400, an electronic device (for example, the electronic device 100) may provide a service using first communication with an external electronic device. For example, the communication control module 170 may provide a voice call service or a moving image synchronization service via first communication with the external electronic device.

In operation 1410, the electronic device may detect reduction of a throughput (TP) in the first communication state with the external electronic device. For example, referring to FIG. 4, the electronic device 400 may perform first communication with the external electronic device 410 in the first area 420. When the external electronic device 410 is moved to the second area 430 where a link loss may be caused, the throughput of the electronic device 400 may be reduced since the quality of communication with the external electronic device 410 deteriorates.

In operation 1420, the electronic device may determine whether the throughput required by the service with the external electronic device exceeds a band width of the first communication or not. According to an exemplary embodiment, the communication control module 170 may compare the throughput required by the service with the external electronic device and the bandwidth which can be provided at a current location.

In operation 1430, when the throughput required by the service does not exceed the bandwidth of the first communication, the electronic device may maintain the first communication.

The electronic device may resume operation 1410 to detect the reduction of the throughput in the first communication state with the external electronic device.

When the throughput required by the service exceeds the band width of the first communication, the electronic device may switch the communication with the external electronic device to the second communication in operation 1440. According to an exemplary embodiment, the communication control module 170 may switch from the first communication to the second communication having a wide bandwidth and thus maintain the currently provided service.

According to an exemplary embodiment, the electronic device may set a time to switch differently according to a distance between the electronic device and the external electronic device. In addition, the electronic device may set the time to switch differently according to a currently provided service.

Figure 15:
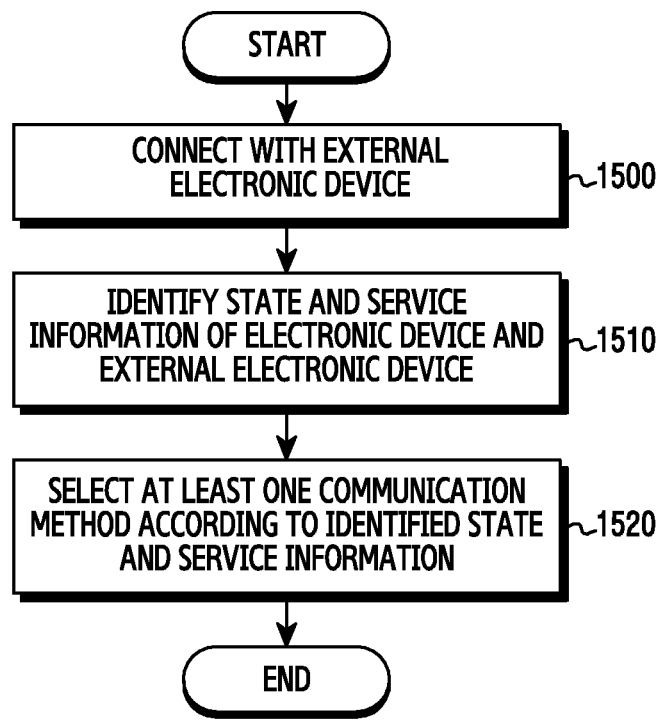
FIG. 15 is a flowchart showing exemplary operation of a method for selecting one or more communication methods according to an exemplary embodiment of the present disclosure.

FIG. 15 illustrates a flowchart showing a method for selecting one or more communication methods according to an exemplary embodiment of the present disclosure.

Referring to FIG. 15, in operation 1500, an electronic device (for example, the electronic device 100) may be connected with an external electronic device. According to an exemplary embodiment, the communication control module 170 may connect communication to provide a service with the external electronic device.

In operation 1510, the electronic device may identify state information and service information of the electronic device and the external electronic device. According to an exemplary embodiment, the communication control module 170 may compare the state information and the service information of the external electronic device and the electronic device and pre-defined reference state and service information. For example, the service information may include the type of service which is being executed or will be executed in the electronic device, the priority (urgency) of the service, the type of data to be transmitted, data capacity, and the like.

In operation 1520, the electronic device may select one or more communication methods according to the state information and the service information of the electronic devices which are identified in operation 1510. For example, the communication control module 170 may switch from the first communication to the second communication based on the state information and the service information of the electronic devices identified in operation 1510. For example, the communication control module 170 may continue maintaining the first communication based on the state information and the service information of the electronic devices identified in operation 1510. For example, the communication control module 170 may connect both the first communication and the second communication based on the state information and the service information of the electronic devices identified in operation 1510.

Figure 16:
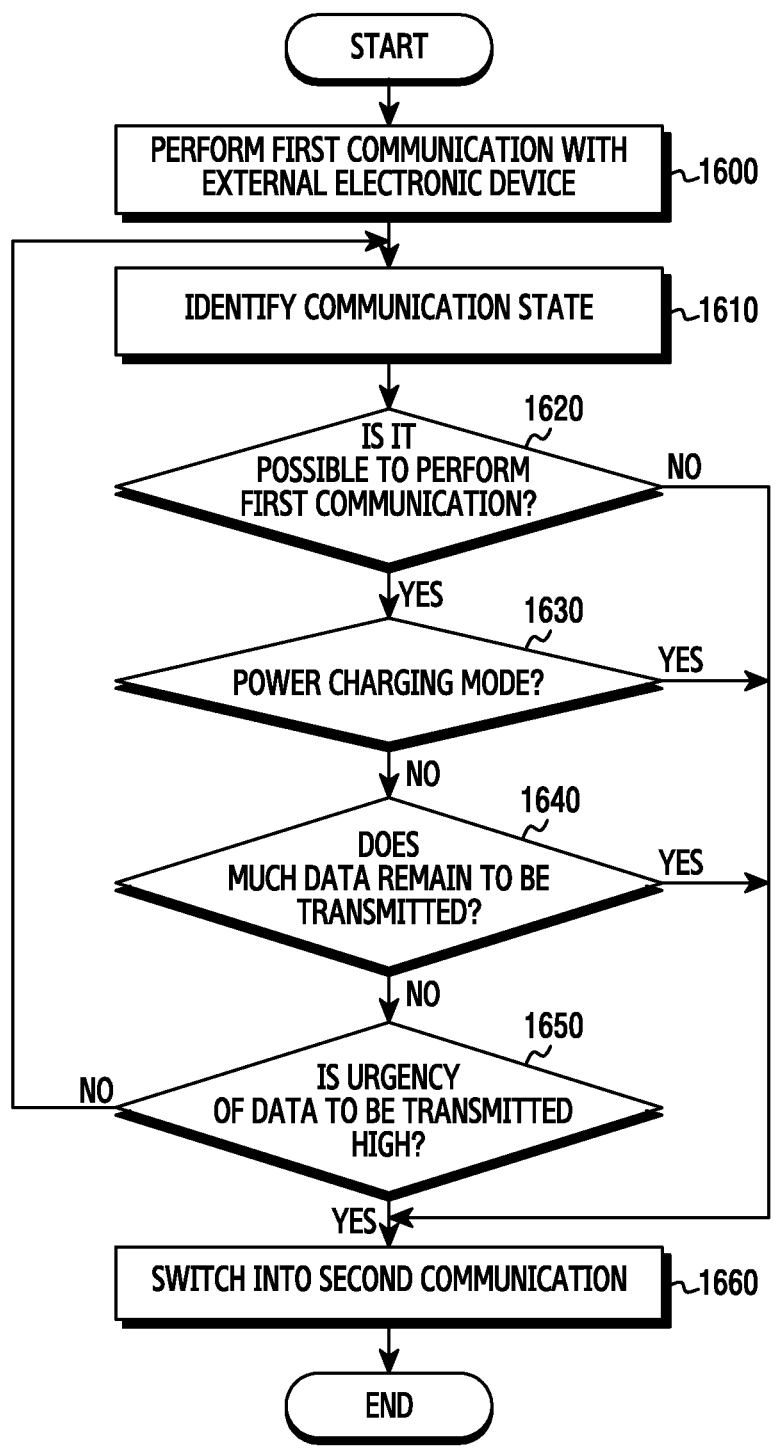
FIG. 16 is a flowchart showing exemplary operation of a method for selecting one or more communication methods according to an exemplary embodiment of the present disclosure.

FIG. 16 illustrates a flowchart showing a method for selecting one or more communication methods according to an exemplary embodiment of the present disclosure.

Referring to FIG. 16, in operation 1600, an electronic device (for example, the electronic device 100) may perform first communication with an external electronic device. For example, the communication control module 170 may connect communication with the external electronic device in the first communication method.

In operation 1610, the electronic device may identify a communication state. According to an exemplary embodiment, the communication control module 170 may monitor an RSSI, communication sensitivity, a communication error rate, a data reception time, or the like while communicating with the external electronic device. According to an exemplary embodiment, the communication control module 170 may estimate a distance to the external electronic device.

Figure 17:
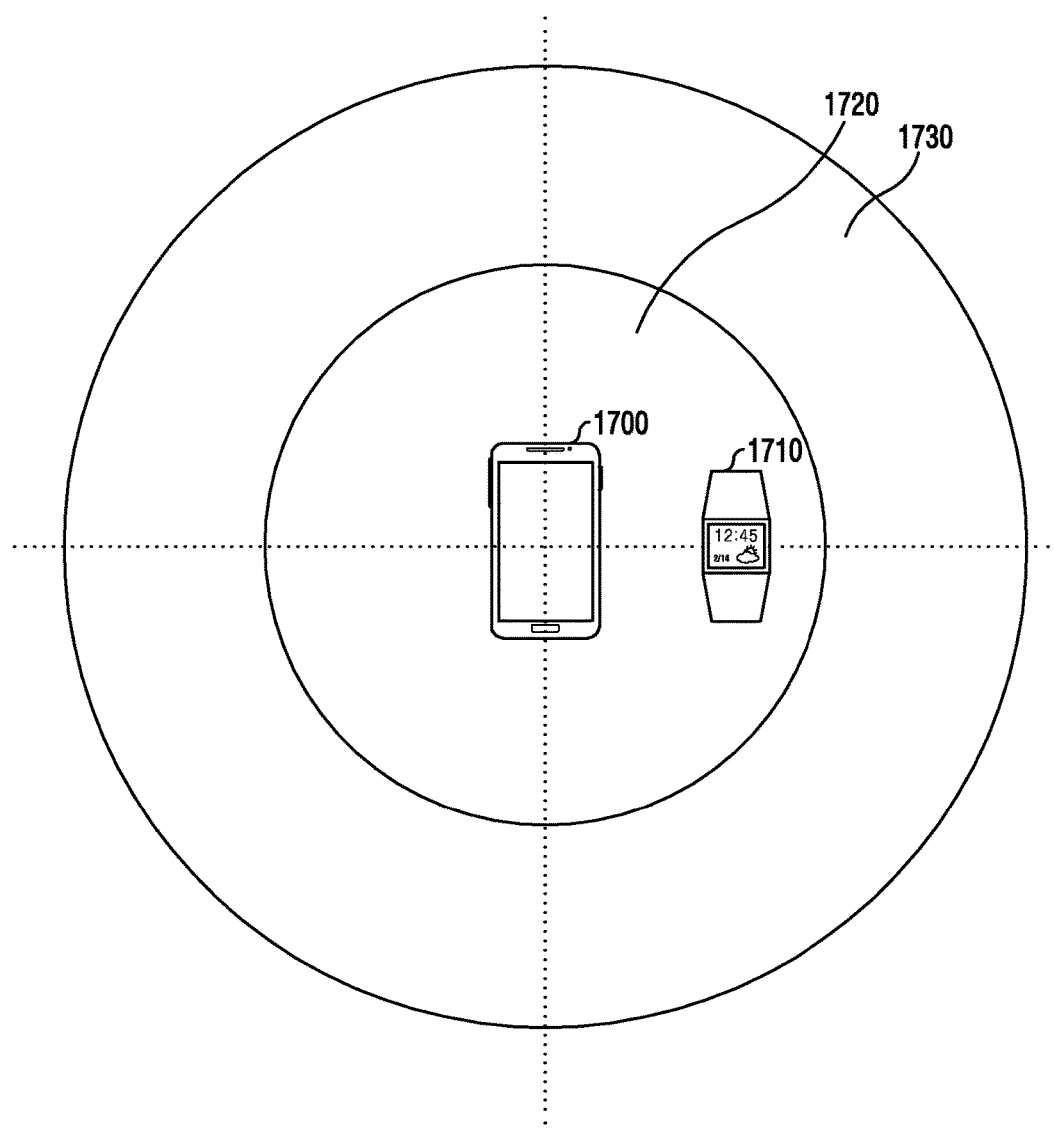
FIG. 17 illustrates a view showing an example in which an electronic device and an external electronic device are located within a first communication area according to an exemplary embodiment of the present disclosure.

In operation 1620, the electronic device may determine whether it is possible to perform the first communication or not. According to an exemplary embodiment, the communication control module 170 may determine whether the external electronic device exists within a first communication range or not. For example, referring to FIG. 17, an electronic device 1700 may be located in a first area 1720 where it is possible for the electronic device 1700 to perform the first communication with an external electronic device 1710. In this case, the electronic device 1700 is also located in a second area 1730 where it is possible for the electronic device 1700 to perform second communication with the external electronic device 1710 as well as the first communication, and thus is capable of performing the second communication. For example, when the external electronic device 1710 is moved out of the first communication range, the distance to the external electronic device 1710 increases and the quality of communication in the first communication method may deteriorate.

In operation 1660, when it is impossible for the electronic device to perform the first communication method, the electronic device may switch to the second communication method. According to an exemplary embodiment, when the distance to the external electronic device exceeds a reference distance, the communication control module 170 may determine that it is impossible to perform the first communication, and switch the communication with the external electronic device to the second communication and maintain the communication connection with the external electronic device.

When it is possible to perform the first communication, the electronic device may determine whether the electronic device or the external electronic device is in a power charging mode or not in operation 1630. According to an exemplary embodiment, when the electronic device or the external electronic device is in the power charging mode, the communication control module 170 does not have to consider a gain accompanied by current consumption and thus may switch to the second communication in operation 1660.

When the electronic device or the external electronic device is not in the power charging mode, the electronic device may determine whether much data remains to be transmitted in operation 1640. According to an exemplary embodiment, the communication control module 170 may determine whether the quantity of data to be transmitted is larger or smaller than a reference data quantity. According to an exemplary embodiment, when much data remains to be transmitted, the communication control module 170 may switch to the second communication which is favorable to high-speed communication in operation 1660.

When less data remains to be transmitted, the electronic device may determine whether the priority/urgency of the data to be transmitted is higher than reference priority/urgency in operation 1650. According to an exemplary embodiment, when the priority/urgency of the data to be transmitted is higher than the reference priority/urgency, the communication control module 170 may switch to the second communication which is favorable to high-speed communication.

When the urgency of the data to be transmitted is low, the electronic device may omit to switch to the second communication method and maintain the first communication method. According to an exemplary embodiment, when less data remains to be transmitted and the priority/urgency of the data is low, the communication control module 170 may not transmit the corresponding data and store the data, and then, when the data is accumulated more than a predetermined quantity, may transmit the data at a time.

Figure 18:
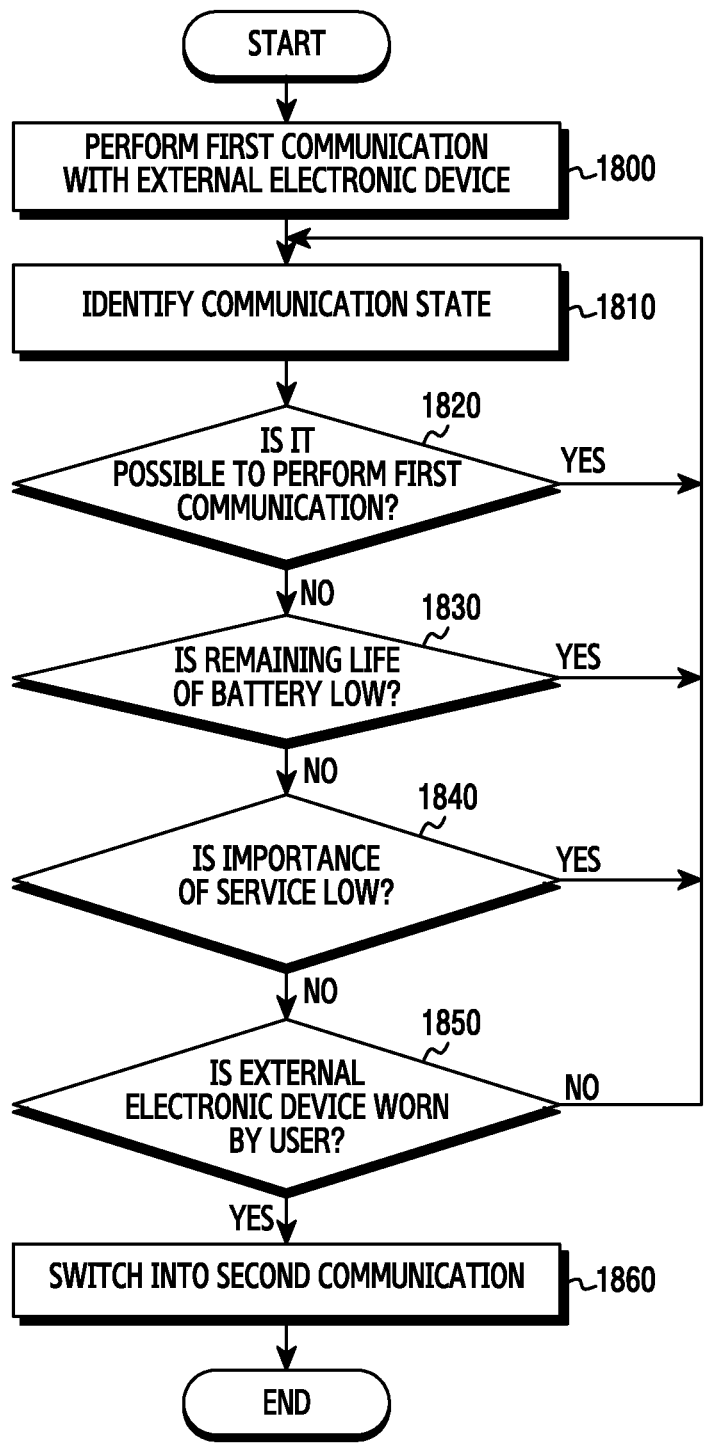
FIG. 18 is a flowchart showing exemplary operation of a method for selecting one or more communication methods according to an exemplary embodiment of the present disclosure.

FIG. 18 illustrates a flowchart showing a method for selecting one or more communication methods according to an exemplary embodiment of the present disclosure.

Referring to FIG. 18, in operation 1800, an electronic device (for example, the electronic device 100) may perform first communication with an external electronic device.

In operation 1810, the electronic device may identify a state of communication with the external electronic device via the first communication. According to an exemplary embodiment, the communication control module 170 may monitor an RSSI, communication sensitivity, a communication error rate, a data reception time, or the like of the communication with the external electronic device via the first communication. According to an exemplary embodiment, the communication control module 170 may identify the communication state by estimating a distance to the external electronic device.

In operation 1820, the electronic device may determine whether it is possible to perform the first communication or not. For example, referring to FIG. 4, the electronic device 400 may determine whether the external electronic device 410 connected in the first communication method in the first area 410 where it is possible to perform the first communication is moved to the second area 430 where it is possible to perform the second communication. When the external electronic device 410 is moved to the second area 430, the electronic device 400 may determine that it is impossible to perform the first communication.

In operation 1830, when it is impossible to perform the first communication, the electronic device may determine whether a remaining life of a battery is low. According to an exemplary embodiment, the communication control module 170 may determine whether the remaining life of the battery of the external electronic device or the electronic device is higher or lower than a reference remaining battery life. According to an exemplary embodiment, when the remaining life of the battery is lower than the reference battery life, the communication control module 170 may maintain the first communication.

When the remaining life of the battery is higher than the reference remaining battery life, the electronic device may determine whether the importance of a service is low or not in operation 1840. According to an exemplary embodiment, the communication control module 170 may determine whether the importance of the service with the external electronic device is lower or higher than reference importance. According to an exemplary embodiment, when the importance of the service is lower than the reference service importance, the communication control module 170 may maintain the first communication.

When the importance of the service is high, the electronic device may determine whether the user wears the external electronic device or not in operation 1850. According to an exemplary embodiment, the communication control module 170 may determine whether the external electronic device is worn on a part of the user's body. According to an exemplary embodiment, when the external electronic device is not worn, the communication control module 170 may maintain the first communication.

When the external electronic device is worn, the electronic device may switch to the second communication in operation 1860.

Figure 19:
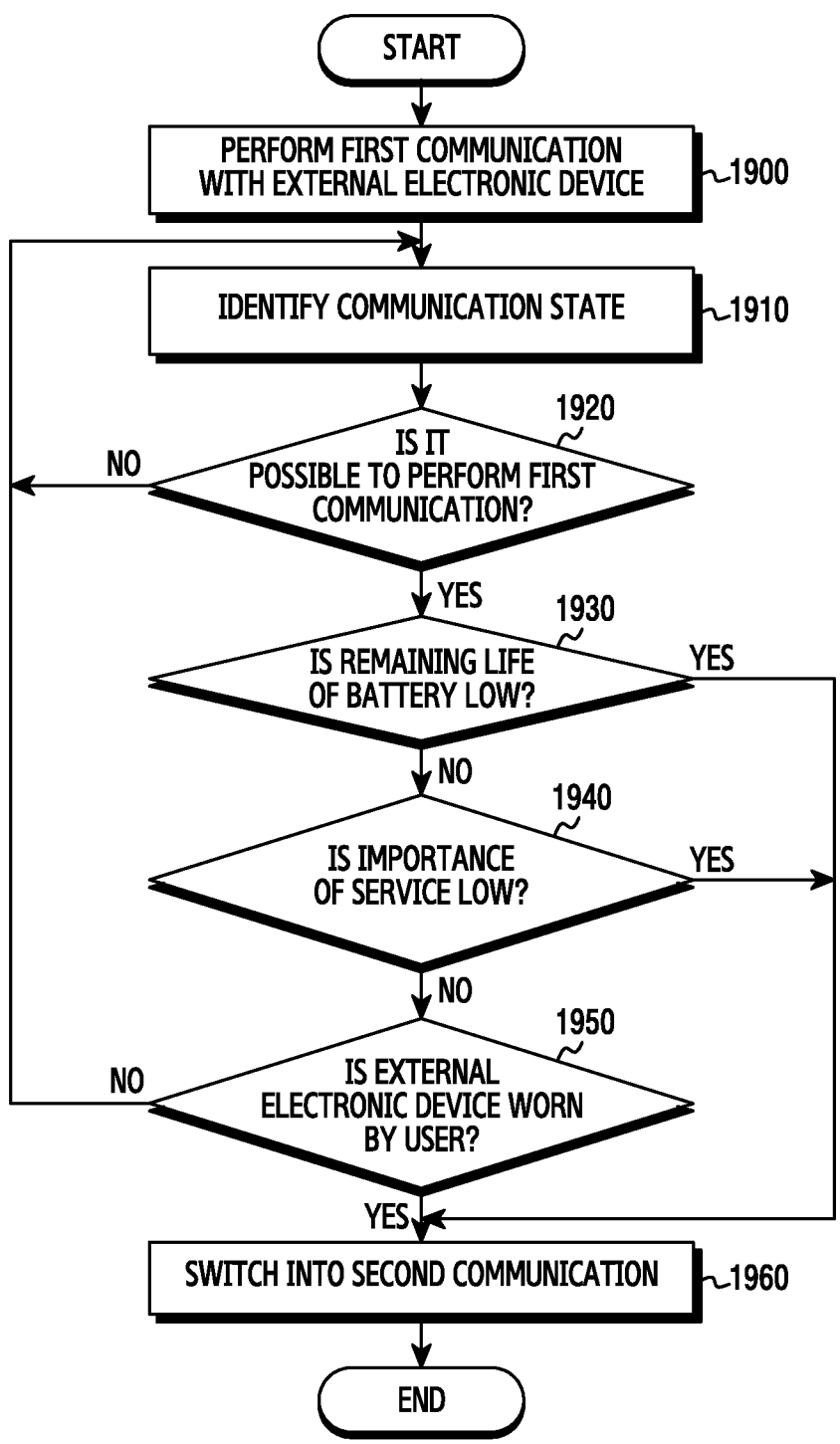
FIG. 19 is a flowchart showing exemplary operation of a method for selecting one or more communication methods according to an exemplary embodiment of the present disclosure.

FIG. 19 illustrates a flowchart showing a method for selecting one or more communication methods according to an exemplary embodiment of the present disclosure.

Referring to FIG. 19, in operation 1900, an electronic device (for example, the electronic device 100) may perform second communication with an external electronic device.

In operation 1910, the electronic device may identify communication state information with the external electronic device. According to an exemplary embodiment, the communication control module 170 may monitor the communication state information with the external electronic device, such as an RSSI, communication sensitivity, a communication error rate, a data reception time, or the like. According to an exemplary embodiment, the communication control module 170 may identify the communication state information with the external electronic device by estimating a distance to the external electronic device.

In operation 1920, the electronic device may determine whether it is possible to perform the first communication or not. According to an exemplary embodiment, the communication control module 170 may determine whether the external electronic device exists within a first communication range or not. For example, referring to FIG. 17, the external electronic device 1710 may be located in the first area 1720 where it is possible to perform both the first communication and the second communication with the electronic device 1700. For example, when the external electronic device 1710 is moved to the second area 1730, it may be possible for the electronic device 1700 to perform only the second communication with the external electronic device 1710, and it may be impossible for the electronic device 1700 to perform the first communication.

When it is possible to perform the first communication, the electronic device may determine whether the electronic device or the external electronic device is in an idle state in operation 1930. According to an exemplary embodiment, the communication control module 170 may determine whether the external electronic device or the electronic device is in the idle mode in which the external electronic device or the electronic device does not perform any operation.

When the external electronic device or the electronic device is in the idle state, the electronic device may switch to the first communication in operation 1960. According to an exemplary embodiment, when the external electronic device or the electronic device is in the idle state, the communication control module 170 may switch to the first communication which requires less power consumption.

When the electronic devices are not in the idle state, the electronic device may determine whether less data remains to be transmitted in operation 1940. According to an exemplary embodiment, the communication control module 170 may determine whether the quantity of data to be transmitted is more or less than a reference data quantity. According to an exemplary embodiment, when less data remains to be transmitted, the communication control module 170 may switch the communication with the external electronic device to the first communication in operation 1960. For example, the communication control module 170 may transmit and receive data to and from the external electronic device using the first communication which requires less power consumption.

When much data remains to be transmitted, the electronic device may determine whether the priority/urgency of the data to be transmitted is low or not in operation 1950. According to an exemplary embodiment, the communication control module 170 may determine whether the priority/urgency of the data to be transmitted is higher or lower than reference priority/urgency.

According to an exemplary embodiment, when the priority/urgency of the data to be transmitted is high, the electronic device may maintain the second communication. According to an exemplary embodiment, when the priority/urgency of the data to be transmitted is low, the electronic device may switch the communication with the external electronic device to the first communication in operation 1960. For example, the electronic device may transmit and receive the data using the first communication which requires less power consumption.

According to various exemplary embodiments of the present disclosure, a method for operating of an electronic device may include: connecting communication with an external electronic device; identifying state information and service information of the electronic device and the external electronic device; and selecting at least one communication method based on the state information and the service information.

According to various exemplary embodiments, the state information of the electronic device and the external electronic device may include at least one of communication state information, wearing state information, battery state information, operation state information, and sensor information, and the service information may include at least one of a type of service, service priority, service importance, a type of data, and a data size.

According to various exemplary embodiments, the selecting the at least one communication method may include selecting at least one of first communication or second communication.

According to various exemplary embodiments, the first communication method and the second communication method have respectively different communication protocols.

According to various exemplary embodiments, the first communication method and the second communication method have respectively different power requirements for operation by the electronic device.

According to various exemplary embodiments, the method may further include, in response to the second communication being selected when the electronic device is connected with the external electronic device via the first communication, switching the communication connection with the external electronic device from the first communication to the second communication.

According to various exemplary embodiments, the method may further include: detecting a link loss with the external electronic device; and, in response to the link loss being detected, determining whether it is necessary to switch the communication and whether it is possible to switch the communication based on the state information and the service information.

According to various exemplary embodiments, the selecting the at least one communication method may include, when it is determined that it is necessary to switch the communication and that it is possible to switch the communication, selecting at least one communication method according to the state information and the service information.

According to various exemplary embodiments, the method may further include disconnecting the communication with the external electronic device based on the state information and the service information.

According to various exemplary embodiments, the method may further include: in response to the communication with the external electronic device being disconnected, discovering another external electronic device; in response to another external electronic device being discovered, identifying state information and service information of the electronic device and another electronic device; and selecting at least one communication method based on the state information and the service information.

According to various exemplary embodiments, the method may further include: identifying data to be transmitted to the external electronic device; determining whether to store the data to be transmitted based on at least one of a size, priority, or urgency of the data to be transmitted; and, when it is determined that the data to be transmitted is stored, storing the data to be transmitted.

According to various exemplary embodiments, the method may further include: when the quantity of the stored data exceeds a threshold, switching to the at least one communication method; and transmitting the stored data in the at least one communication method.

Figure 20:
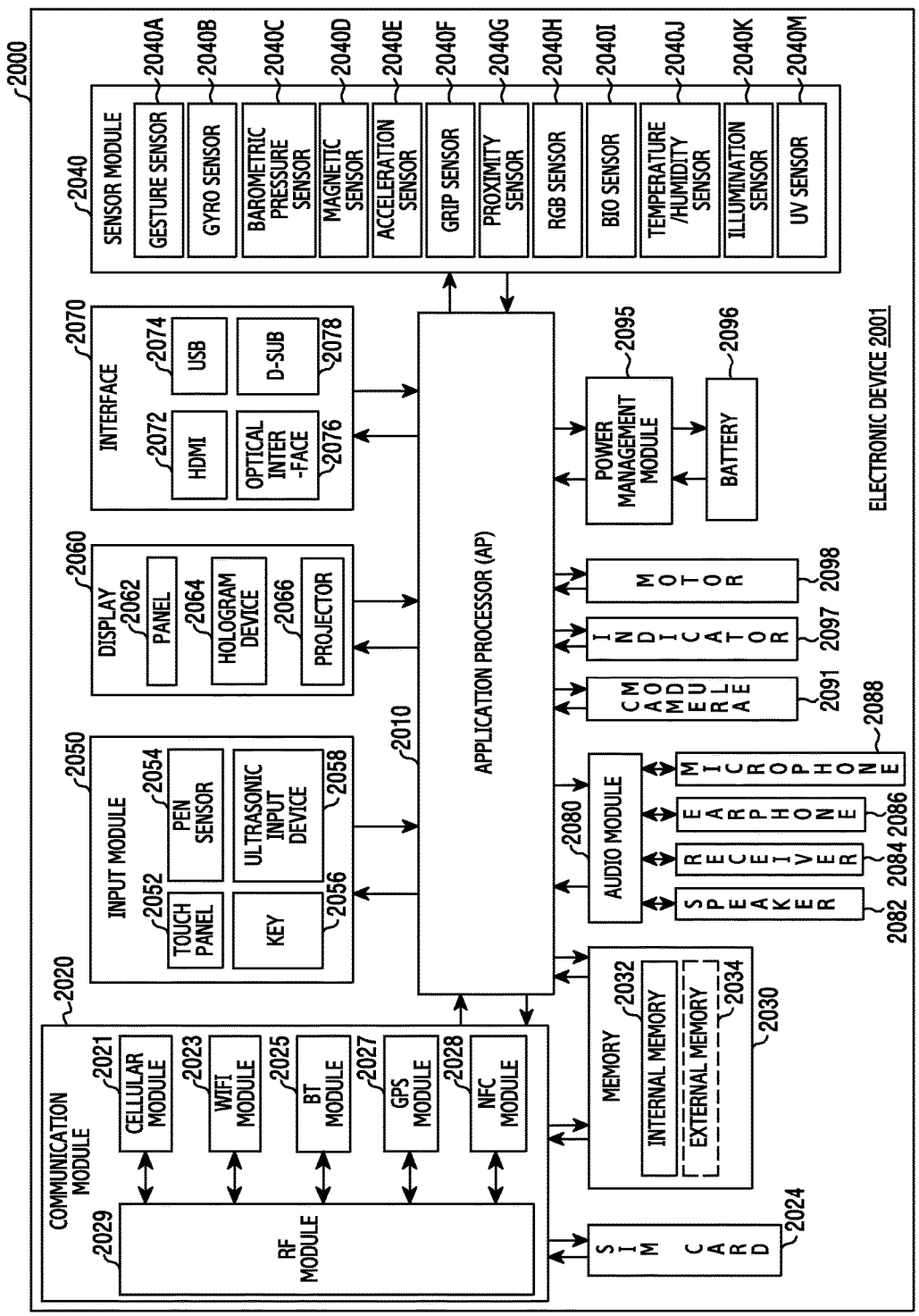
FIG. 20 illustrates a block diagram showing an electronic device according to various exemplary embodiments of the present disclosure.

FIG. 20 illustrates a block diagram 2000 of an electronic device 2001 according to various exemplary embodiments. The electronic device 2001 may configure the entirety or part of the electronic device 100 shown in FIG. 1.

Referring to FIG. 20, the electronic device 2001 may include one or more Application Processors (APs) 2010, a communication module 2020, a Subscriber Identification Module (SIM) card 2024, a memory 2030, a sensor module 2040, an input device 2050, a display 2060, an interface 2070, an audio module 2080, a camera module 2091, a power management module 2095, a battery 2096, an indicator 2097, or a motor 2098.

The AP 2010 may control a plurality of hardware or software elements connected to the AP 2010 by driving an operating system or an application program, and may process and calculate a variety of data including multimedia data. For example, the AP 2010 may be implemented by using a System on Chip (SoC). According to an exemplary embodiment, the AP 2010 may further include a Graphic Processing Unit (GPU) (not shown).

The communication module 2020 may transmit and receive data via communication between the electronic device 2001 (for example, the electronic device 100) and other electronic devices (for example, the electronic device 100 or server 106) connected through a network. According to an exemplary embodiment, the communication module 2020 may include a cellular module 2021, a WiFi module 2023, a BT module 2025, a GPS module 2027, an NFC module 2028, and a Radio Frequency (RF) module 2029.

The cellular module 2021 may provide a voice call, a video call, a text service, or an internet service through a telecommunications network (for example, LTE, LTE-A, CDMA, WCDMA, UMTS, WiBro, GSM, and the like). In addition, the cellular module 2021 may identify and authenticate the electronic device in the telecommunications network by using a subscriber identification module (for example, the SIM card 2024). According to an exemplary embodiment, the cellular module 2021 may perform at least some of the functions provided by the AP 2010. For example, the cellular module 2021 may perform at least some of the multimedia control functions.

According to an exemplary embodiment, the cellular module 2021 may include a Communication Processor (CP). In addition, the cellular module 2021 may be implemented by using a SoC, for example. In FIG. 20, the cellular module 2021 (for example, the communication processor), the memory 2030, or the power management module 2095 are elements separate from the AP 2010. However, according to an exemplary embodiment, the AP 2010 may be configured to include at least some of the above-described elements (for example, the cellular module 2021).

According to an exemplary embodiment, the AP 2010 or the cellular module 2021 (for example, the communication processor) may load instructions or data received from a non-volatile memory connected therewith or at least one of the other elements into a volatile memory, and may process the instructions or data. In addition, the AP 2010 or the cellular module 2021 may store data which is received from at least one of the other elements or generated by at least one of the other elements in the non-volatile memory.

The WiFi module 2023, the BT module 2025, the GPS module 2027, or the NFC module 2028 each may include a processor for processing data received and transmitted through a corresponding module. In FIG. 20, the cellular module 2021, the WiFi module 2023, the BT module 2025, the GPS module 2027, or the NFC module 2028 is illustrated in a separate block. However, according to an exemplary embodiment, at least some (for example, two or more) of the cellular module 2021, the WiFi module 2023, the BT module 2025, the GPS module 2027, or the NFC module 2028 may be included in a single integrated chip (IC) or a single IC package. For example, at least some of the processors corresponding to the cellular module 2021, the WiFi module 2023, the BT module 2025, the GPS module 2027, and the NFC module 2028 (for example, the communication processor corresponding to the cellular module 2021 and the WiFi processor corresponding to the WiFi module 2023) may be implemented by using a single SoC.

The RF module 2029 may transmit and receive data, for example, an RF signal. Although not shown, the RF module 2029 may include a transceiver, a Power Amp Module (PAM), a frequency filter, or a Low Noise Amplifier (LNA), for example. In addition, the RF module 2029 may further include a part for exchanging electromagnetic waves in a free space in wireless communication, for example, a conductor or conducting wire. In FIG. 20, the cellular module 2021, the WiFi module 2023, the BT module 2025, the GPS module 2027, and the NFC module 2028 share the single RF module 2029 with one another. However, according to an exemplary embodiment, at least one of the cellular module 2021, the WiFi module 2023, the BT module 2025, the GPS module 2027, or the NFC module 2028 may transmit and receive an RF signal through a separate RF module.

The SIM card 2024 may be a card including a subscriber identification module, and may be inserted into a slot formed on a specific location of the electronic device. The SIM card 2024 may include unique identification information (for example, an Integrated Circuit Card Identifier (ICCID)) or subscriber information (for example, International Mobile Subscriber Identity (IMSI)).

The memory 2030 (for example, the memory 130) may include an internal memory 2032 or an external memory 2034. For example, the internal memory 2032 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like).

According to an exemplary embodiment, the internal memory 2032 may be a Solid State Drive (SSD). The external memory 2034 may further include a flash drive, for example, Compact Flash (CF), Secure Digital (SD), Micro-SD, Mini-SD, extreme-Digital (xD), a memory stick, and the like. The external memory 2034 may be functionally connected with the electronic device 2001 through various interfaces. According to an exemplary embodiment, the electronic device 2001 may further include a storage device (or a storage medium) such as a hard drive.

The sensor module 2040 may measure a physical quantity or detect an operation state of the electronic device 2001, and may convert measured or detected information into electric signals. The sensor module 2040 may include at least one of a gesture sensor 2040A, a gyro sensor 2040B, a barometric pressure sensor 2040C, a magnetic sensor 2040D, an acceleration sensor 2040E, a grip sensor 2040F, a proximity sensor 2040G, a color sensor 2040H (e.g., Red, Green, Blue (RGB) sensor), a biosensor 2040I, a temperature/humidity sensor 2040J, an illumination sensor 2040K, and a Ultraviolet (UV) sensor 2040M. Additionally or alternatively, the sensor module 2040 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor (not shown), and the like. The sensor module 2040 may further include a control circuit to control at least one sensor included therein.

The input device 2050 may include a touch panel 2052, a (digital) pen sensor 2054, a key 2056, or an ultrasonic input device 2058. The touch panel 2052 may recognize a touch input in at least one method of capacitive, resistive, infrared, and ultrasonic methods. In addition, the touch panel 2052 may further include a control circuit (not shown). In the embodiment of a capacitive method, the touch panel 2052 may recognize physical contact or hovering. The touch panel 2052 may further include a tactile layer. In this embodiment, the touch panel 2052 may provide a tactile response to the user.

The (digital) pen sensor 2054 may be implemented in the same or similar method as or to the method of receiving a user's touch input or by using a separate detection sheet. The key 2056 may include a physical button, an optical key, or a keypad. The ultrasonic input device 2058 allows the electronic device 2001 to detect sound waves through a microphone (for example, the microphone 2088) through an input device generating ultrasonic signals, and is capable of wireless recognition. According to an exemplary embodiment, the electronic device 2001 may receive a user input from an external device connected thereto (for example, a computer or a server) by using the communication module 2020.

The display 2060 may include a panel 2062, a hologram device 2064, or a projector 2066. For example, the panel 2062 may be a Liquid Crystal Display (LCD) or an Active Matrix Organic Light Emitting Diode (AM-OLED). For example, the panel 2062 may be implemented to be flexible, transparent, or wearable. The panel 2062 may be configured as a single module along with the touch panel 2052. The hologram device 2064 may show a stereoscopic image in the air using interference of light. The projector 2066 may display an image by projecting light onto a screen. The screen may be located inside or outside the electronic device 2001. According to an exemplary embodiment, the display 2060 may further include a control circuit to control the panel 2062, the hologram device 2064, or the projector 2066.

The interface 2070 may include a High Definition Multimedia Interface (HDMI) 2072, a Universal Serial Bus (USB) 2074, an optical interface 2076, or D-subminiature (sub) 2078. The interface 2070 may be included in the communication interface 160 shown in FIG. 1. Additionally or alternatively, the interface 2070 may include a Mobile High Definition Link (MHL) interface, a Secure Digital (SD)/Multimedia Card (MMC) interface or Infrared Data Association (IrDA) standard interface.

The audio module 2080 may convert between a sound and an electric signal bidirectionally. For example, the audio module 2080 may process sound information which is input or output through a speaker 2082, a receiver 2084, an earphone 2086, or a microphone 2088.

The camera module 2091 is a device for photographing a still image and a moving image, and, according to an exemplary embodiment, the camera module 2091 may include one or more image sensors (for example, a front surface sensor or a rear surface sensor), a lens (not shown), an Image Signal Processor (ISP) (not shown), or a flash (memory) (for example, a Light Emitting Diode (LED) or a xenon lamp).

The power management module 2095 may manage power of the electronic device 2001. Although not shown, the power management module 2095 may include a Power Management IC (PMIC), a charger IC, or a battery or fuel gage. For example, the PMIC may be mounted in an integrated circuit or a SoC semiconductor.

The charging method may be divided into a wire charging method and a wireless charging method. The charging IC may charge a battery and may prevent inflow of overvoltage or over current from a charger. According to an exemplary embodiment, the charger IC may include a charger IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 2096, a voltage, a current, or temperature during charging. The battery 2096 may store or generate electricity and may supply power to the electronic device 2001 by using stored or generated electricity. The battery 2096 may include a rechargeable battery or a solar battery.

The indicator 2097 may display a specific state of the electronic device 2001 or a part of it (for example, the AP 2010), for example, a booting state, a message state, or a charging state. The motor 2098 may convert an electric signal into a mechanical vibration. Although not shown, the electronic device 2001 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

When it is impossible to perform a first communication while an electronic device performs the first communication with an external electronic device, the electronic device and an operating method thereof according to various exemplary embodiments may switch to a second communication based on state information and service information of the electronic device and the external electronic device, and thus continue maintaining communication with the external electronic device.

An electronic device and an operating method thereof according to various exemplary embodiments selects a second communication method to be switched based on the characteristic of data to be transmitted when first communication is disconnected, and thus can reduce current consumption caused by communication connection.

An electronic device and an operating method thereof according to various exemplary embodiments can reduce current consumption caused by communication connection by trying to connect communication after communication is disconnected, and reducing a standby time.

When data of low priority/urgency is transmitted via first communication, an electronic device and an operating method thereof according to various exemplary embodiments may store a predetermined quantity of data and transmit the data via high-speed second communication, and thus can reduce current consumption caused by data transmission.

When a service of low importance is used and an electronic device deviates from a communication range, the electronic device and an operating method thereof according to various exemplary embodiments omit to switch a communication method and thus can reduce current consumption for maintaining communication connection.

An electronic device and an operating method thereof according to various exemplary embodiments set a time to switch a communication method based on an executed service, and thus can continuously provide communication for providing a service.

An electronic device and an operating method thereof according to various exemplary embodiments provide a specific service while maintaining first communication and second communication simultaneously, and thus can improve service quality.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se.

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

Each of the above-described elements of the electronic device according to various exemplary embodiments of the present disclosure may be comprised of one or more components, and the names of the elements may vary according to the type of the electronic device. The electronic device according to various exemplary embodiments of the present disclosure may include at least one of the above-described elements, and some of the elements may be omitted or an additional element may be further included. In addition, some of the elements of the electronic device according to various exemplary embodiments of the present disclosure may be combined into a single entity, and may perform the same functions as those of the elements before being combined.

The term "module" used in various exemplary embodiments of the present disclosure is to be understood to be statutory subject matter under 35 U.S.C. § 101 under its broadest reasonable interpretation refers to a unit including one of hardware, machine executable code on a non-transitory medium that is loaded into hardware to configure operation of the hardware, and firmware, or a combination of two or more of them, for example. For example, the "module" may be used interchangeably with terms like logic, logical block, component or circuit. The "module" may be a minimum unit of an integrally configured part or a part of it. The "module" may be a minimum unit that performs one or more functions or a part of it. The "module" may be implemented mechanically or electronically. For example, the "module" according to various exemplary embodiments of the present disclosure may include at least one of an Application Specific Integrated Circuit (ASIC) chip, Field Programmable Gate Arrays (FPGAs), and a programmable logic device which perform any operation that is already well known or will be developed in the future.

At least part of the apparatus (for example, modules or functions) or method (for example, operations) according to various exemplary embodiments of the present disclosure may be implemented by using instructions stored in a computer-readable storage media in the form of a programming module. When the instructions are executed by one or more processors (for example, the processor 120), the one or more processors may perform a function corresponding to the instructions. The computer-readable storage media may be the memory 130, for example. At least part of the programming module may be implemented (for example, executed) by using the processor 120. At least part of the programming module may include a module, a program, a routine, sets of instructions, a process, and the like for performing one or more functions.

Examples of the computer-readable recording medium include magnetic media such as hard disks, floppy disks and magnetic tapes, optical media such as Compact Disc Read Only Memories (CD-ROMs) and Digital Versatile Disc (DVDs), magneto-optical media such as floptical disks, and hardware devices such as Read Only Memories (ROMs), Random Access Memories (RAMs) and flash memories that are especially configured to store and execute program commands (for example, the programming module). Examples of the program commands include machine language codes created by a compiler, and high-level language codes that can be executed by a computer by using an interpreter. The above-described hardware devices may be configured to operate as one or more software modules for performing operations of various exemplary embodiment of the present disclosure, and vice versa.

A module or programming module according to various exemplary embodiments of the present disclosure may include one or more of the above-described elements, may omit some elements, or may further include additional elements. The operations performed by the module, the programming module, or the other elements according to various exemplary embodiments of the present disclosure may be performed serially, in parallel, repeatedly, or heuristically. In addition, some operation may be performed in different order or may omitted, and an additional operation may be added.

According to various exemplary embodiments, the instructions stored in the storage medium may be set to allow at least one processor to perform at least one operation when the instructions are executed by the at least one processor, and the at least one operation may include: connecting communication with an external electronic device; identifying state information and service information of the electronic device and the external electronic device; and selecting at least one communication method based on the state information and the service information.

While the embodiments in this disclosure have been shown and described with reference to certain preferred embodiments thereof, it will be understood by those skilled in the art that various changes in form and details may be made therein without departing from the spirit and scope of the appended claims. Therefore, the scope of the disclosure is defined not by the detailed description but by the appended claims, and all differences within the scope will be construed as being included in the appended claims.

What is claimed is:

1. A method in an electronic device, comprising:
   detecting an external electronic device;
   acquiring at least one of state information and service information of the electronic device and the external electronic device;
   selecting at least a first communication system and a second communication system from a plurality of communication systems based on the acquired information;
   determining whether a data transmission is pending from the electronic device to the external electronic device;
   if the data transmission is pending, completing the pending data transmission using the first communication system; and
   in response to completing the pending data transmission, communicating with the external electronic device using the second communication system.

2. The method of claim 1, wherein the acquiring of the state information comprises acquiring at least one of communication state information, wearing state information, battery state information, operation state information, and sensor information, and
   wherein the acquiring of the service information comprises acquiring at least one of a type of service, service priority, service importance, a type of data, and a data size.

3. The method of claim 1, further comprising, in absence of the pending data transmission, communicating with the external electronic device using the second communication system.

4. The method of claim 1, further comprising:
   detecting a link loss with the external electronic device; and
   in response to the link loss being detected, transmitting a discovery signal to detect the external electronic device.

5. The method of claim 1, further comprising disconnecting the communication with the external electronic device based on the state information and the service information.

6. The method of claim 5, further comprising:
   in response to the communication with the external electronic device being disconnected, discovering another external electronic device;
   in response to the another external electronic device being discovered, identifying state information and service information of the electronic device and the another electronic device; and
   selecting at least one communication system to communicate with the another external electronic device based on the state information and the service information.

7. An electronic device comprising:
   a communication module configured to communicate with an external electronic device; and
   a processor configured to:
     select a first communication system and a second communication system from a plurality of communication systems based on state information and service information of the electronic device and the external electronic device,
     determine whether a data transmission is pending from the electronic device to the external electronic device;
     if the data transmission is pending, complete the data transmission using the first communication system; and
     in response to completing the pending data transmission, communicating with the external electronic device using the second communication system.

8. The electronic device of claim 7, wherein the state information comprises at least one of communication state information, wearing state information, battery state information, operation state information, and sensor information, and
   wherein the service information comprises at least one of a type of service, service priority, service importance, a type of data, and a quantity of data.

9. The electronic device of claim 7, wherein the first communication system and the second communication system have respectively different communication ranges.

10. The electronic device of claim 9, wherein, in absence of the pending data transmission, the processor is configured to communicate with the external electronic device using the second communication system.

11. The electronic device of claim 7, wherein, in response to a link loss with the external electronic device being detected, the processor is configured to control the communication module to transmit a discovery signal to detect the external electronic device.

12. The electronic device of claim 7, wherein the processor is configured to disconnect the communication with the external electronic device based on the state information and the service information.

13. The electronic device of claim 12, wherein, in response to the communication with the external electronic device being disconnected, the processor is configured to discover another external electronic device through the communication module, and, in response to another external electronic device being discovered, to select at least one communication system of the plurality of communication systems based on state information and service information of the electronic device and another electronic device.

14. The electronic device of claim 7, wherein the processor is configured to:
  determine whether to store data in the pending data transmission based on at least one of a size, a quantity, a priority, or an urgency of the data,
  when the data is determined to be stored:
    control to prevent the pending data transmission, and
    control to store the data in a memory of the electronic device.

15. The electronic device of claim 14, wherein, when a quantity of the stored data exceeds a threshold, the processor is configured to control to switch to the second communication system, and transmit the stored data using the second communication system.

* * * * *